(12) United States Patent
Eguchi

(10) Patent No.: US 11,646,060 B1
(45) Date of Patent: May 9, 2023

(54) POLYDYNE ACCELERATION TRAJECTORY CONTROL

(71) Applicant: Western Digital Technologies, Inc., San Jose, CA (US)

(72) Inventor: Takehiko Eguchi, Tokyo (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/575,976

(22) Filed: Jan. 14, 2022

(51) Int. Cl.
*G11B 21/10* (2006.01)
(52) U.S. Cl.
CPC .................. *G11B 21/106* (2013.01)
(58) Field of Classification Search
None
See application file for complete search history.

(56) References Cited

U.S. PATENT DOCUMENTS

| | | | |
|---|---|---|---|
| 5,872,674 A * | 2/1999 | Eddy | G11B 21/085 360/77.04 |
| 5,982,173 A * | 11/1999 | Hagen | G11B 5/59688 |
| 6,005,742 A | 12/1999 | Cunningham et al. | |
| 6,088,187 A | 7/2000 | Takaishi | |
| 6,314,473 B1 * | 11/2001 | Singer | G11B 5/5556 318/560 |
| 6,798,604 B1 * | 9/2004 | Kamimura | G11B 5/5582 360/77.03 |
| 7,054,098 B1 * | 5/2006 | Yu | G11B 5/54 |
| 7,215,499 B1 * | 5/2007 | Li | G11B 5/5547 |
| 7,283,321 B1 | 10/2007 | Sun et al. | |
| 7,440,220 B1 * | 10/2008 | Kang | G11B 21/21 360/75 |
| 7,486,469 B1 * | 2/2009 | Semba | G11B 5/5547 360/75 |
| 9,911,442 B1 | 3/2018 | Kharisov et al. | |
| 9,940,958 B1 | 4/2018 | Kiyonaga et al. | |
| 10,049,691 B1 | 8/2018 | Gaertner et al. | |
| 10,410,657 B1 | 9/2019 | Zhou et al. | |
| 2002/0101681 A1 * | 8/2002 | He | G11B 5/4873 |
| 2006/0233073 A1 * | 10/2006 | Pae | G11B 7/08511 |
| 2007/0007921 A1 * | 1/2007 | Ratliff | G11B 5/5582 318/432 |
| 2008/0130159 A1 * | 6/2008 | Dieron | G11B 5/607 |
| 2009/0086365 A1 * | 4/2009 | Fukushima | G11B 5/59627 360/77.04 |

(Continued)

OTHER PUBLICATIONS

Atsumi, Takenori "Feedforward Control Using Sampled-Data Polynomial for Track Seeking in Hard Disk Drives", IEEE Transactions on Industrial Electronics, vol. 56, No. 5, pp. 1338-1346, May 2009.

(Continued)

*Primary Examiner* — Peter Vincent Agustin
(74) *Attorney, Agent, or Firm* — Neugeboren O'Dowd PC

(57) ABSTRACT

Various illustrative aspects are directed to a system comprising: an actuator; a control object, controlled by the actuator; and one or more processing devices, configured to perform positioning control of the control object via the actuator, wherein performing the positioning control comprises: generating a trajectory control signal for a trajectory that comprises a polydyne acceleration ramp; and outputting the trajectory control signal to the actuator.

20 Claims, 37 Drawing Sheets

(56) References Cited

U.S. PATENT DOCUMENTS

2009/0268572 A1* 10/2009 Van Endert .......... G11B 7/1267
2010/0182892 A1*  7/2010 Sergey ................ G11B 9/1481
369/126

OTHER PUBLICATIONS

Kang et al., "Design of Seeking Control Based on Two-Degree-of-Freedom Controller Using Frequency Shaped Final-State Control", The International Federation of Automatic Control, 17th IFAC World Congress, pp. 1803-1808, Jul. 6-11, 2008.
Kanzaki et al., "Polydyne Cam Mechanisms for Typehead Positioning", Journal of Engineering for Industry, pp. 250-254, Feb. 1972.
Kawakita et al., "Active Sampled-Data Controlled Suspension in Automobile with Vibration Manipulation Functions Intermittent Desired Elongation Control of Actuator", International Journal of Automotive Engineering, vol. 7, pp. 77-84, 2016.
Kobayashi et al., "Track Seek Control for Hard Disk Dual-Stage Servo Systems", IEEE Transactions on Magnetics, vol. 37, No. 2, pp. 949-954, Mar. 2001.
Shah, Prateek "Joint Feedback Feedforward Data Driven Control Design and Input Shaping Techniques for Multi Actuator Hard Disk Drives", UC Berkeley Electronic Theses and Dissertations, 133 pages, 2020.
Yan et al., "Polydyne Servo-Cam Design", Journal of the Chinese Society of Mechanical Engineers, vol. 22, No. 2, pp. 1-3, Apr. 1, 2001.

\* cited by examiner

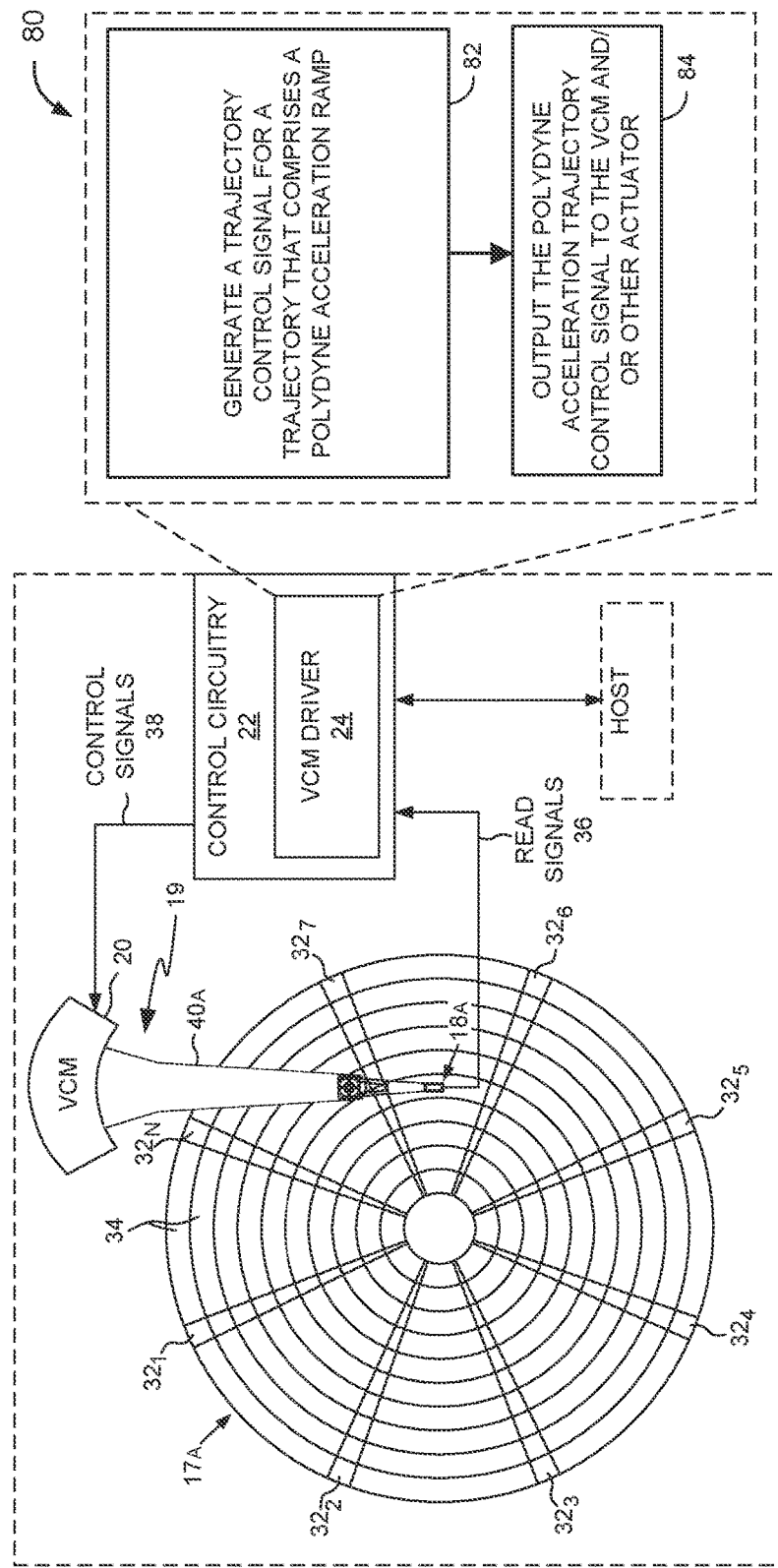
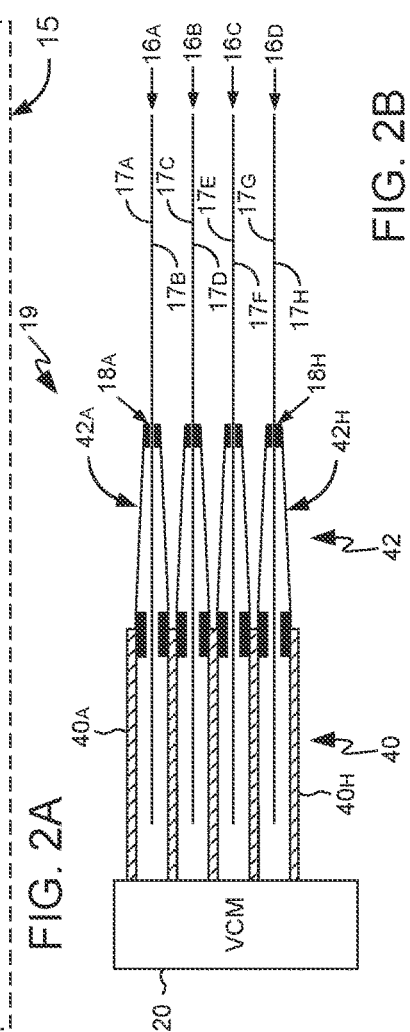

(a) 5th order polydyne ramp (b) 9th order polydyne ramp

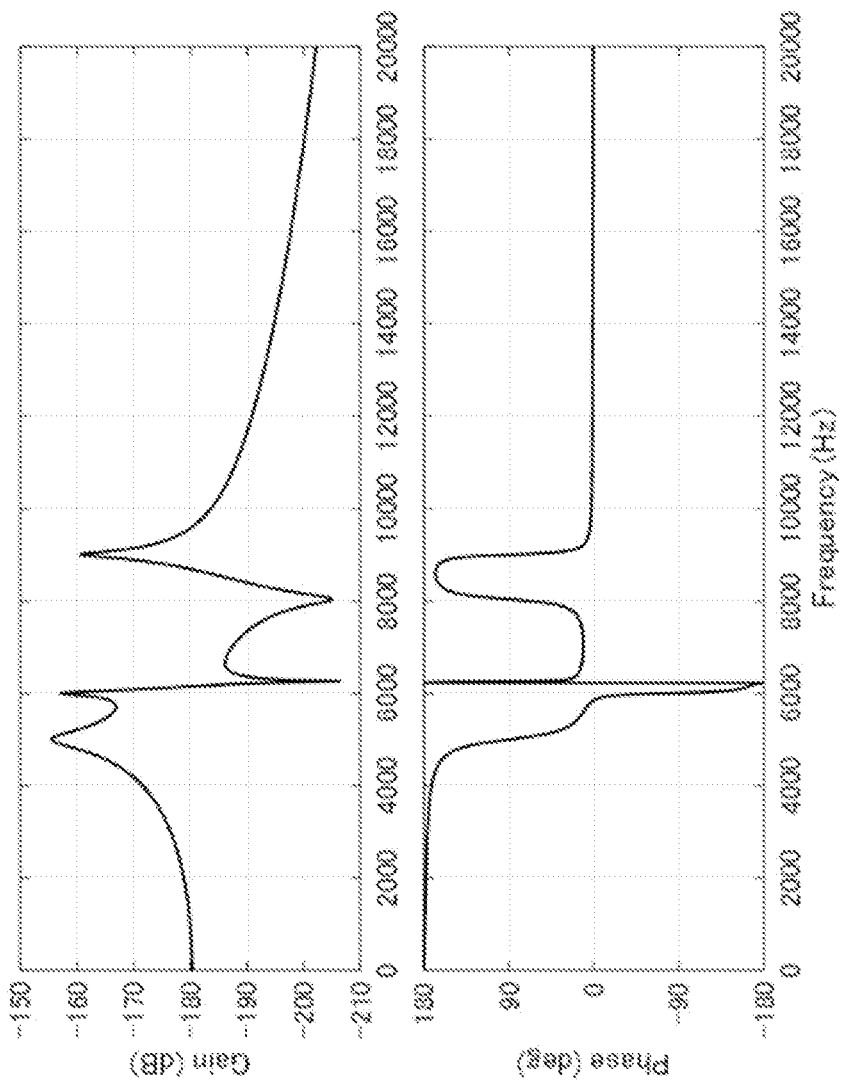

(a) Trajectory-1 (No ramp)

(b) Trajectory-2 (Linear ramp)

(a) Trajectory-1 (No ramp)

(b) Trajectory-2 (Linear ramp)

(c) Trajectory-3 (5th order polydyne ramp)

(d) Trajectory-4 (9th order polydyne ramp)

(a) System frequencies as designed (b) Frequencies higher by 3% than designed ones (a) Position, velocity, and acceleration (b) Residual vibration spectrum

POLYDYNE ACCELERATION TRAJECTORY CONTROL

BACKGROUND

Various technologies and product categories require high-speed and/or high-precision positioning and acceleration trajectory control. One example is data storage devices such as disk drives, which must perform high-speed and high-precision acceleration trajectory control of read/write heads proximate to media surfaces. Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 6. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge 64) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to the one or more actuators in order to actuate the head radially over the disk in a direction that reduces the PES.

SUMMARY

Various aspects disclosed herein provide polydyne acceleration trajectory control for systems requiring acceleration trajectory control, particularly high-speed and/or high-precision acceleration trajectory control, such as data storage devices, systems, and methods, among other aspects. Polydyne acceleration trajectory control, comprising polydyne acceleration ramps, may provide faster and more precise positioning control for seek operations in a data storage system, among many other applications.

In accordance with principles of this disclosure, control circuitry may design an acceleration trajectory by using polydyne curves to ramp acceleration up and down, which may suppress the residual vibrations related to multiple resonant modes. Polydyne curves are optimal cam profiles that do not excite residual vibrations due to the follower's resonant mode, and can be applied to a feedforward input for a positioning control. The acceleration and position trajectories may be used as feedforward inputs in a two-degree-of-freedom (2-DOF) controller.

For long motions, the acceleration trajectory may often dwell at its maximum value in its acceleration and deceleration portions and change quickly between them. Instantaneous onset of acceleration typically causes a large vibration, and suppressing the transient vibration is an important issue on high-speed and high-precision positioning control.

Acceleration trajectories designed with polydyne curves in accordance with principles of this disclosure may suppress transient vibrations. In illustrative examples, a fifth-order polydyne acceleration ramp may suppress one resonant mode, and a ninth-order polydyne ramp may suppress two resonant modes. In addition, canceling vibrations generated at the beginning and end of the ramp portions with each other may suppress another mode, and may be performed in combination with polydyne acceleration ramp-ups and ramp-downs. Various examples may suppress three or more resonant modes.

Simulation studies of examples of the present disclosure have been performed using a mechanical model which has three resonant modes, and which demonstrated that example polydyne acceleration trajectories of the present disclosure suppressed residual vibration completely. Further simulations by using a one-degree-of-freedom (1-DOF) vibration system have been performed to study the relationships of the residual vibration with the natural frequency and damping ratio of an example system. These simulations confirmed that the residual vibration spectra associated with acceleration trajectories with polydyne ramps of the present disclosure had notches at the frequencies designed to be suppressed.

Various illustrative aspects are directed to a system comprising: an actuator; a control object, controlled by the actuator; and one or more processing devices, configured to perform positioning control of the control object via the actuator, wherein performing the positioning control comprises: generating a trajectory control signal for a trajectory that comprises a polydyne acceleration ramp; and outputting the trajectory control signal to the actuator.

Various illustrative aspects are directed to a method comprising: generating, by one or more processing devices, a trajectory control signal for a trajectory that comprises a polydyne acceleration ramp; and outputting, by the one or more processing devices, the trajectory control signal to an actuator that controls a control object.

Various illustrative aspects are directed to one or more processing devices comprising: means for generating a trajectory control signal for a trajectory that comprises a polydyne acceleration ramp; and means for outputting the trajectory control signal to an actuator that controls a control object.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

FIGS. 2A and 2B illustrate conceptual block diagrams of a top view and a side view of a data storage device in the form of a disk drive, in accordance with aspects of the present disclosure.

FIG. 2C illustrates a method that a data storage device may perform, execute, and implement, in accordance with aspects of the present disclosure.

FIGS. 5A and 5B show the frequency response of a mechanical vibration model which has three resonance modes; FIG. 5A shows the gain in decibels (dB) and FIG. 5B shows the phase in degrees.

FIGS. 6A-6L show the vibration responses of each mode in the mechanical model when the acceleration trajectory shown in FIGS. 3A-F and FIGS. 4A-F is applied to the model as input force are shown.

DETAILED DESCRIPTION

1. Introduction

Figure 1:
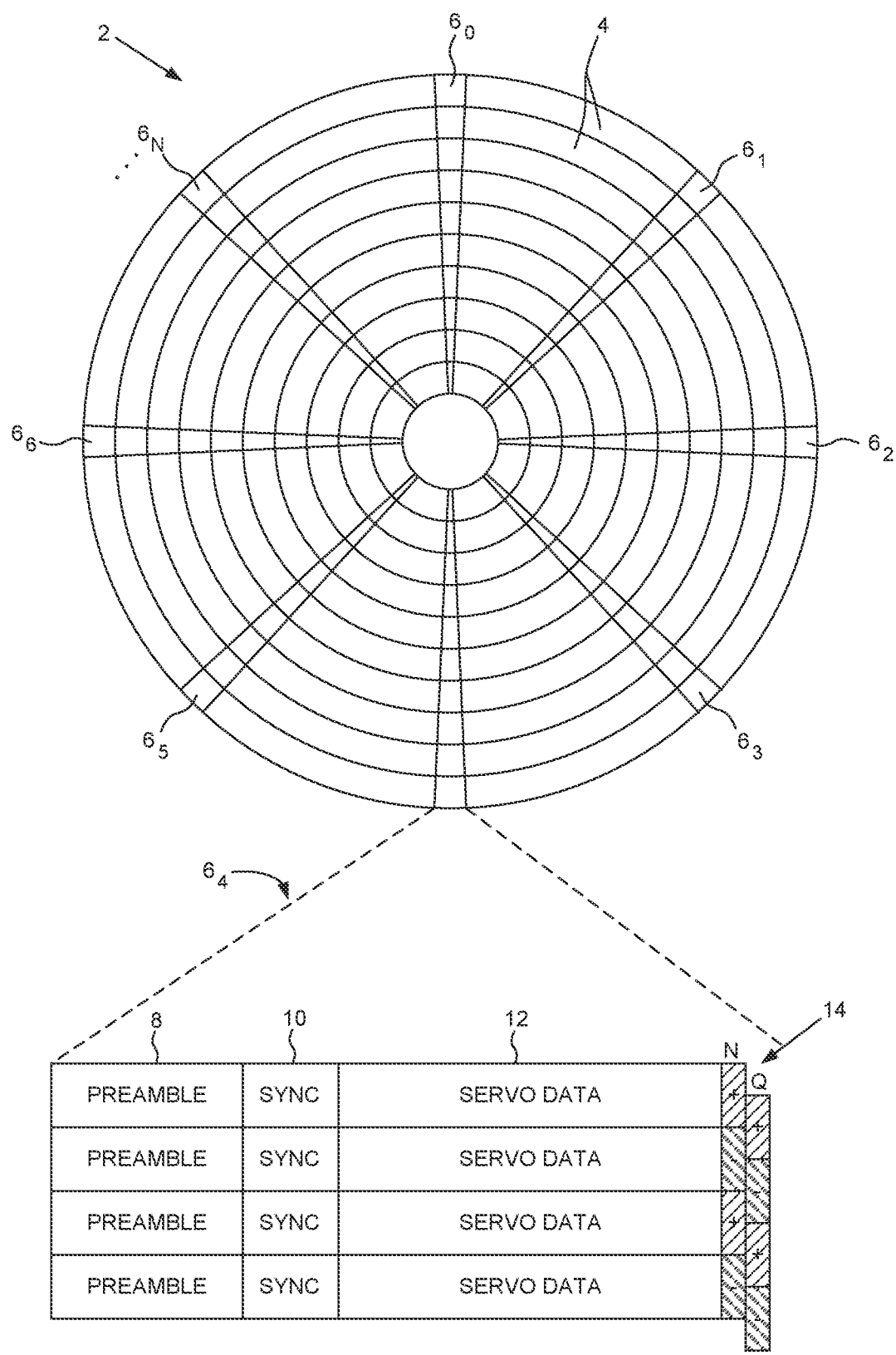
FIG. 1 shows a prior art disk format as comprising a number of radially-spaced, concentric servo tracks defined by servo wedges recorded around the circumference of each servo track.

In high-speed and high-precision control systems, such as hard disk drive seek control, it has been a persistent, long-term goal for hard disk drive control systems to suppress residual vibration related to mechanical resonant modes of the control object, such as a read/write head in a hard disk drive. In high-speed and high-precision control systems such as hard drive seek control, suppressing residual vibration related to mechanical resonant modes of the control object is important. Feedforward control methods may be used to generate smooth trajectories for short motions, in which the acceleration is much smaller than its limit value. Various techniques for such an application may include using a minimum-jerk trajectory defined in a continuous-time system (where jerk is the rate of change of acceleration over time, or equivalently, the third derivative of position with respect to time); using a Final State Control (FSC) method for a sampled-data control system; or using a Frequency-shaped Final State Control (FFSC) method to decrease frequency components associated with the mechanical resonant modes in feedforward input. For long motions, on the other hand, a minimum-time solution is a method that accelerates the control object at maximum acceleration then decelerates at a negative maximum value, but the immediate onset of acceleration makes a large shock and vibration at the object. A potentially better strategy for mitigating the shock and vibration is to ramp up the acceleration by placing a limit on jerk. One technique involves using a polydyne cam as an optimal cam profile to not cause residual vibration due to the follower's resonant mode. This may be applied to feedforward input for high-speed positioning control. A polydyne curve may be applied to motion control using a DC servo motor. A polydyne curve may be used to ramp up velocity and acceleration from zero to a target value, and to ramp velocity and acceleration back down to zero at a target position. Polydyne acceleration ramp-ups and ramp-downs may be collectively referred to as polydyne acceleration ramps.

In accordance with aspects of this disclosure, a feedforward control method may use a polydyne curve to ramp acceleration up and down in an acceleration trajectory that suppresses the residual vibrations of a control object that has resonant modes, even with more than three resonant modes. To suppress the vibrations of multiple resonant modes, aspects of this disclosure may use two principles. A basis polynomial may be defined as the values of itself and the first and second-order derivatives are all continuous at the beginning and end of the polynomial. A polydyne curve may be obtained as a linear combination of the basis polynomial and its derivatives, and its coefficients may be determined by the natural frequency and damping ratio of the one or more resonant modes to be suppressed. If an obtained polynomial can satisfy the same boundary conditions, a new polydyne curve may be obtained that suppresses two resonant modes by using the original polydyne curve as the basis polynomial. In theory, a polydyne curve may be designed to suppress any number of resonant modes, but it is not practical to deal with a large number of resonant modes since the order of the polynomial increases by four for every resonant mode to be suppressed.

Another mechanism for suppressing vibrations may be to cancel the transient vibration that is generated at the beginning of an acceleration ramp, i.e., a ramp portion of the acceleration (either the ramp-up portion or the ramp-down portion) by the vibration generated at the end of the ramp portion of the acceleration. The phase of the vibration at the beginning or a first portion of an acceleration ramp may be advanced to the vibration at the end or a final portion of an acceleration ramp, due to the natural frequency of the object, and its magnitude may be attenuated by the damping. If the magnitudes of the two vibrations are equal and the phase is opposite, they may be canceled with each other so that the residual vibrations are suppressed. Since the ramp time in example acceleration trajectories in accordance with this disclosure may be as short as the duration of the resonant mode, the attenuation by damping may be small enough to ignore and the uncertainty of the phase may be minimal. These aspects show that such ramp vibration cancelation may be advantageous in accordance with aspects of this disclosure. Ramp vibration cancelation may be used in combination with polydyne acceleration ramp trajectory control, and may help suppress more resonant modes.

In aspects of this disclosure, an acceleration trajectory for feedforward control may be designed using polydyne curves in acceleration and deceleration portions of the trajectory. Simulation analyses were performed in which mechanical vibration systems were driven by feedforward control input, the accelerations were constant in acceleration and deceleration portions, and the responses of the system were computed as a continuous-time system. The simulations performed demonstrated that example trajectories in accordance with aspects of this disclosure completely suppressed the residual vibration of example mechanical systems which have three resonant modes. The simulations showed relationships of amplitudes of residual vibration with the natural frequency and damping ratio of the systems. The relationship with natural frequency may be consistent with a Shock-Response-Spectrum analysis. Aspects of this disclosure demonstrate acceleration trajectories for feedforward positioning control which suppress multiple resonant modes of a mechanical system, and clarify their characteristics by simulations in continuous-time domain. Various aspects of this disclosure may comprise a variety of applications of polydyne curves to sampled-data control systems.

Example simulation studies in aspects of this disclosure were directed to seek control of a hard disk drive. Example aspects of a hard disk drive in accordance with this disclosure are described as follows. In other examples of this disclosure, the proposed sampled-data polydyne can be applied to any kind of high-speed and high-precision positioning control systems, with applications in a variety of product categories.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator assembly 19, and a plurality of hard disks 16A, 16B, 16C, 16D ("hard disks 16," "disks 16"). FIG. 2C depicts a flowchart for an example method 80 that control circuitry 22 of disk drive 15 may perform or execute in controlling the operations of disk drive 15, including the operations of a primary actuator, e.g., a voice coil motor ("VCM") 20, that rotates and controls actuator assembly 19, in accordance with aspects of the present disclosure, as further described below. For example, control circuitry 22 may control the actuation motions of VCM 20 using polydyne acceleration trajectory control, in accordance with various aspects of this disclosure, as further described below.

VCM 20 is configured to control actuator assembly 19, which comprises one or more read/write heads 18 ("head 18"), to position the one or more heads 18 over disk surfaces 17 of the one or more disks 16. Heads 18 may each be configured for writing and reading control features and data to and from a corresponding disk surface 17 of hard disks 16. Actuator assembly 19 comprises a number of actuator arms 40 (e.g., topmost actuator arm 40A, as seen in the perspective view of FIGS. 2A and 2B). Each of actuator arms 40 comprises one of heads 18 at a distal end thereof (e.g., example head 18A comprised in topmost actuator arm 40A, in the view of FIGS. 2A and 2B). Each of actuator arms 40 is configured to suspend one of heads 18 in close proximity over a corresponding disk surface 17 of the one or more disks 16 (e.g., head 18A suspended by topmost actuator arm 40A over topmost corresponding disk surface 17A, head 18H suspended by lowest actuator arm 40H over lowest corresponding disk surface 17H). Various examples may include any of a wide variety of other numbers of hard disks and disk surfaces, other numbers of actuator arm assemblies and primary actuators besides the one actuator assembly 19 and the one primary actuator 20 in the example of FIGS. 2A and 2B, and one or more fine actuators on each actuator arm, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may take the form of one or more processing devices, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples.

Control circuitry 22 may comprise one or more processing devices that constitute device drivers, specially configured for driving and operating certain devices. Such device drivers comprised in control circuitry 22 may comprise one or more actuator drivers such as VCM driver 24, configured for driving and operating VCM 20. VCM driver 24 may control VCM 20 to perform various operations, including primary seek operations of actuator arm assembly 19, as further described below. VCM driver 24 may also control VCM 20 to actuate actuator arm assembly 19 to reduce position error signal (PES) based on servo signals, as further described below.

Example disk drive 15 of FIGS. 2A and 2B comprises four hard disks 16. Other examples may comprise any number of disks, such as just one disk, two disks, three disks, or five, ten, twenty, or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends the heads 18 of each actuator arm 40 over and proximate to a corresponding disk surface 17, enabling each head 18 to write control features and data to, and read control features and data from, its respective, proximate disk surface 17. In this sense, head 18 of each actuator arm 40 interacts with a corresponding disk surface 17. The heads 18 write to and read from their corresponding disk surfaces 17 under the positioning control of VCM 20 under the control of control circuitry 22, in this example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes read signals 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter. Control circuitry 22 generates control signals 38 applied to actuator arm assembly 19, including to control VCM 20, which rotates actuator arm assembly 19 about an axial pivot in order to actuate actuator arm assembly 19 and the corresponding heads 18 radially over the disk surfaces 17 in primary seek operations, and in operations to reduce the PES based on the servo signals.

In the example of FIGS. 2A and 2B, VCM 20 rotates actuator arm assembly 19 and actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. Other examples may employ more than two actuator arm assemblies or primary actuators or multi-actuators, which may be actuated about a common pivot, or which may be comprised in multiple multi-actuators mounted at different circumferential locations about the disks.

In executing example method 80 of FIG. 2C (aspects of which will also be further explained below with reference to the further figures), control circuitry 22 may issue a plurality of commands to other components of disk drive 15, receive information from other components of disk drive 15, and perform operations, such as generating signals for outputting or applying to system components of disk drive 15. In particular, control circuitry 22, and in some examples, VCM driver 24 of control circuitry 22, may generate a polydyne acceleration trajectory control signal for a trajectory that comprises a polydyne acceleration ramp (82), and output the trajectory control signal to an actuator such as VCM 20 (84). In some examples, VCM driver 24 of control circuitry 22 may use a polydyne acceleration trajectory control signal as feedforward input for a high-speed and high-precision positioning control system that does not excite specified mechanical resonant modes, among other advantages, such as in seek control or other actuation control for a data storage system such as a hard disk drive.

2. Acceleration Trajectory with Polydyne Ramp

2.1 Trajectory with Constant Acceleration

Figure 3A:
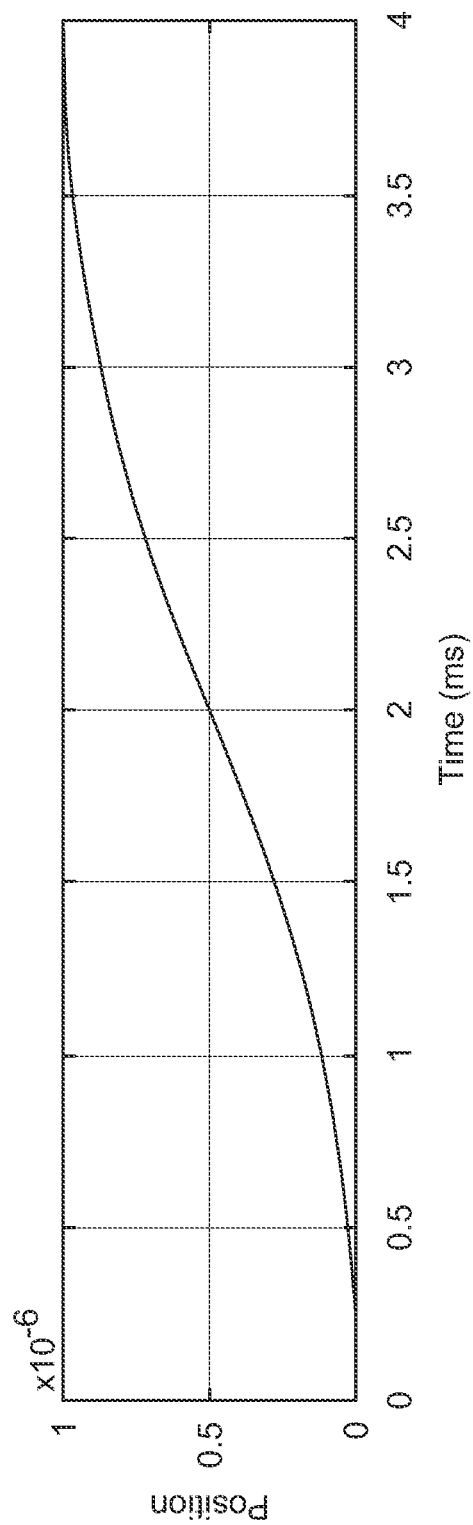
FIGS. 3A-C show graphs of position, velocity, and acceleration over time, respectively, for a control trajectory with no acceleration ramp.
Figure 3B:
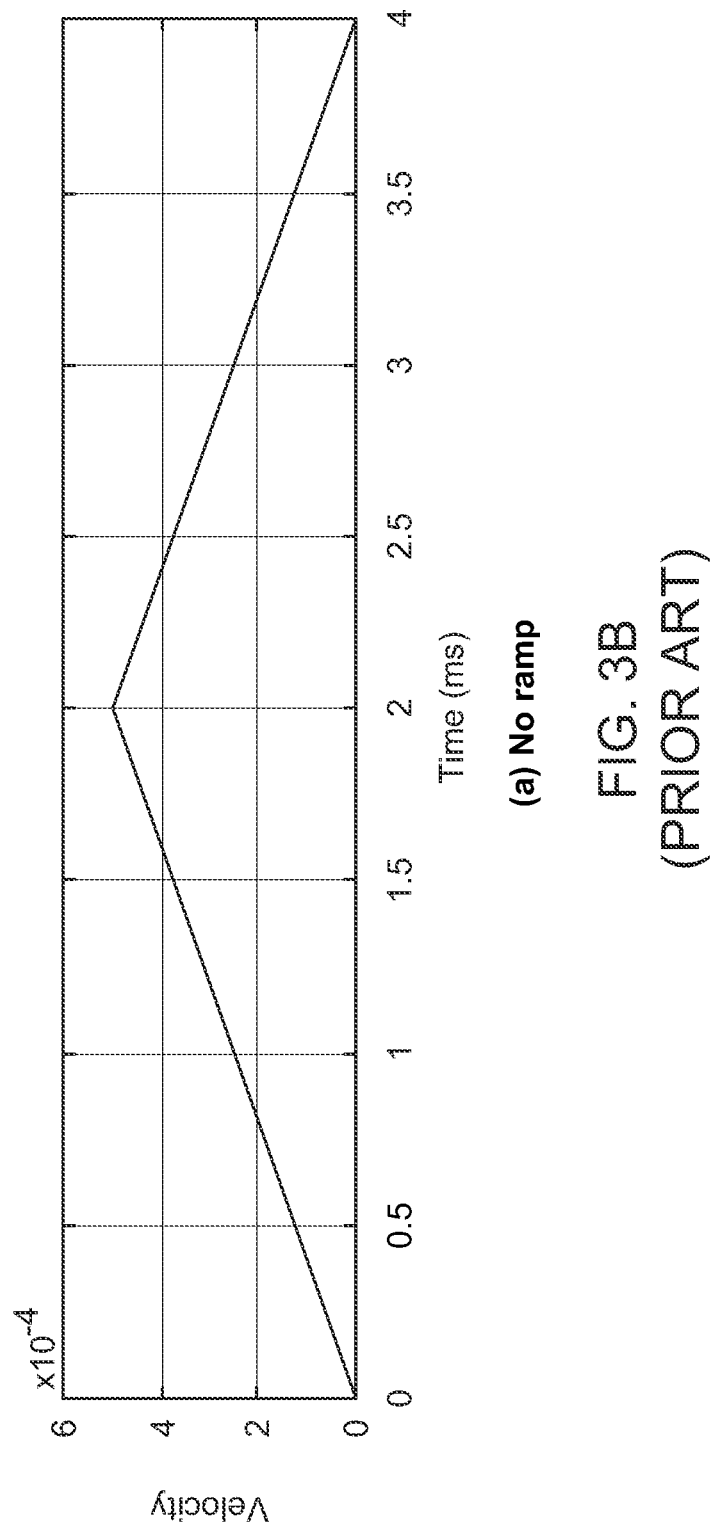
Figure 3C:
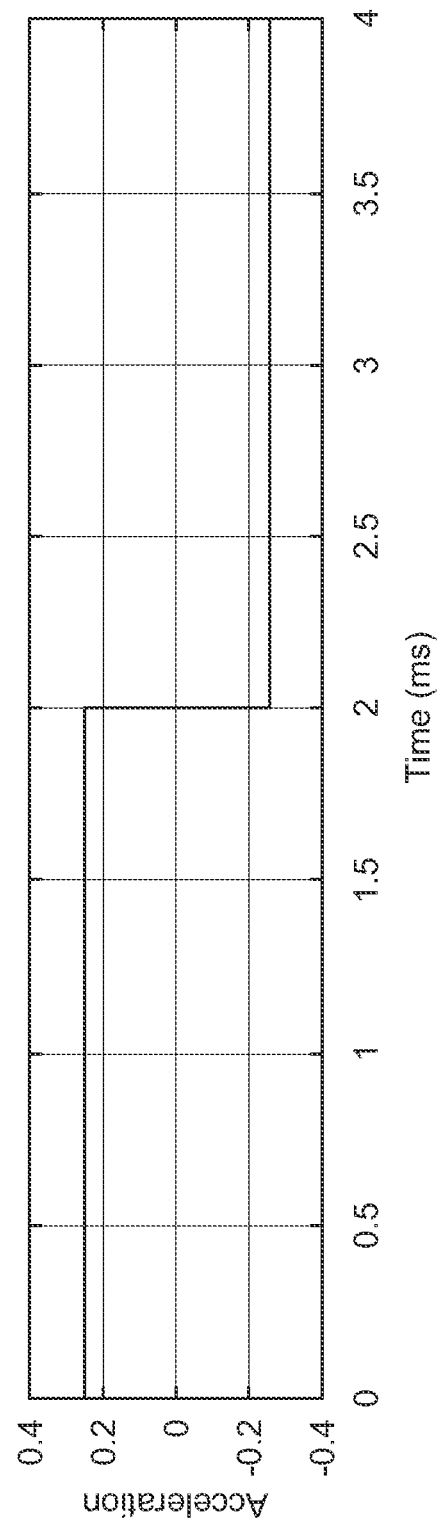

When the maximum value of acceleration during acceleration and deceleration is constrained in position control to move a control object from one position to the next, the shortest time solution has constant acceleration and deceleration, as shown in FIGS. 3A-C. FIGS. 3A-C show graphs of position, velocity, and acceleration over time, respectively, for a control trajectory with no acceleration ramp. This trajectory is known to minimize work, and often appeared as an optimal trajectory in position control theory. However, abrupt change in acceleration causes excessive shock to the mechanical system, and transient vibrations of the system make precise positioning difficult. A potentially better strategy, to avoid excessive shocks and transient vibrations, and to enable more precise positioning, may be to ramp up the acceleration by placing a limit on jerk.

2.2 Trajectory with Constant Jerk

Figure 3D:
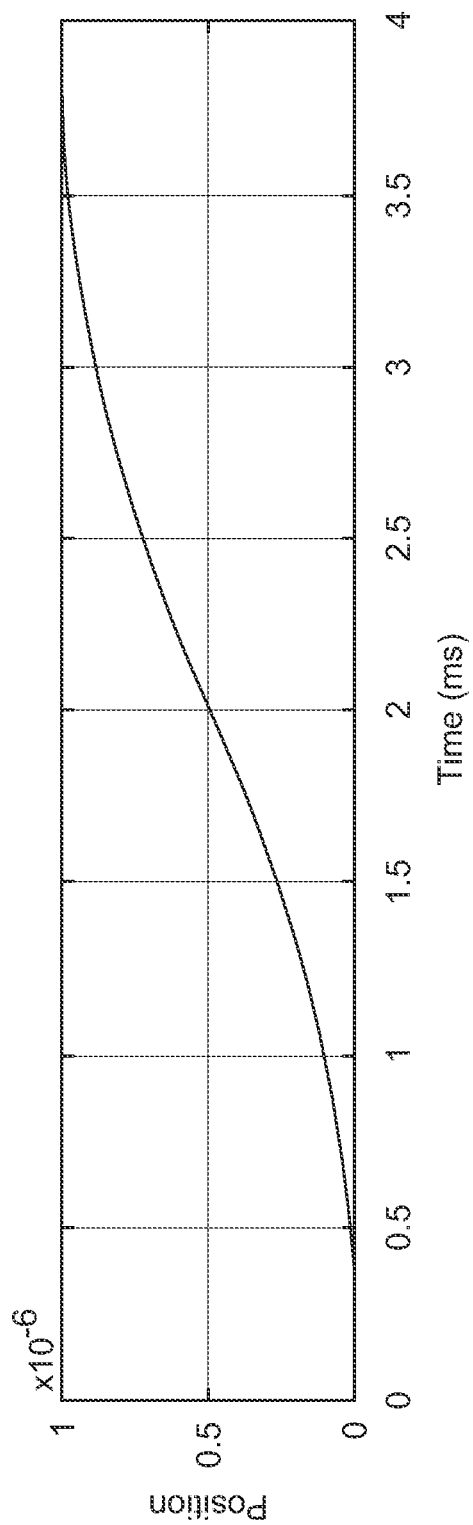
FIGS. 3D-F show graphs of position, velocity, and acceleration over time, respectively, for a linear ramp trajectory, in which the maximum value of jerk is limited.
Figure 3E:
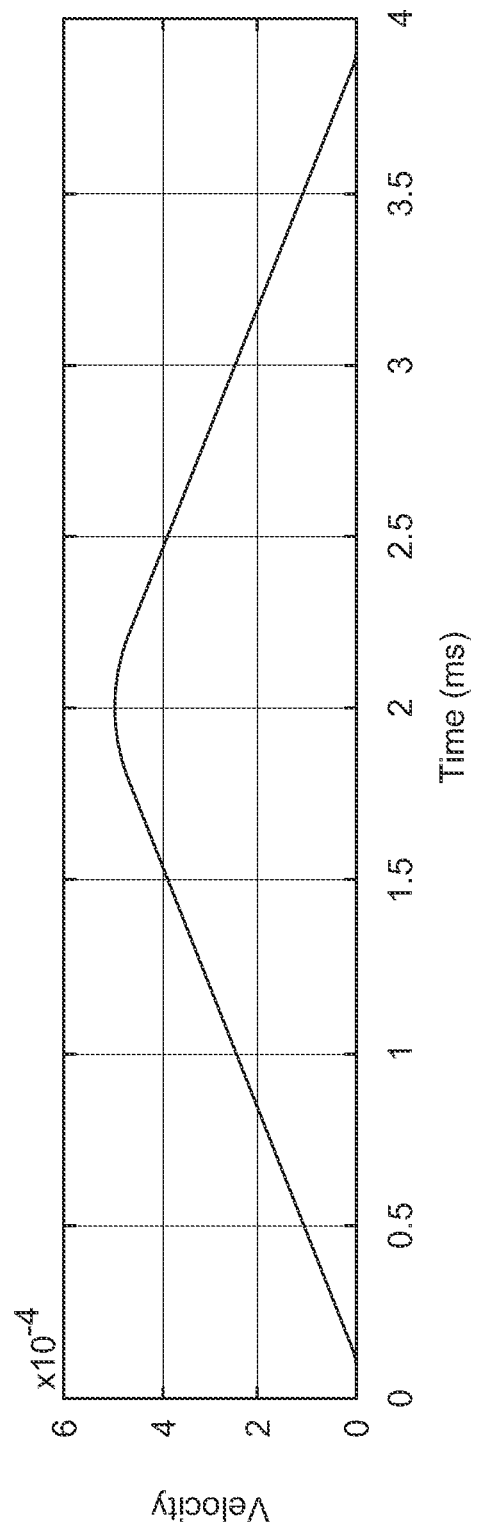
Figure 3F:
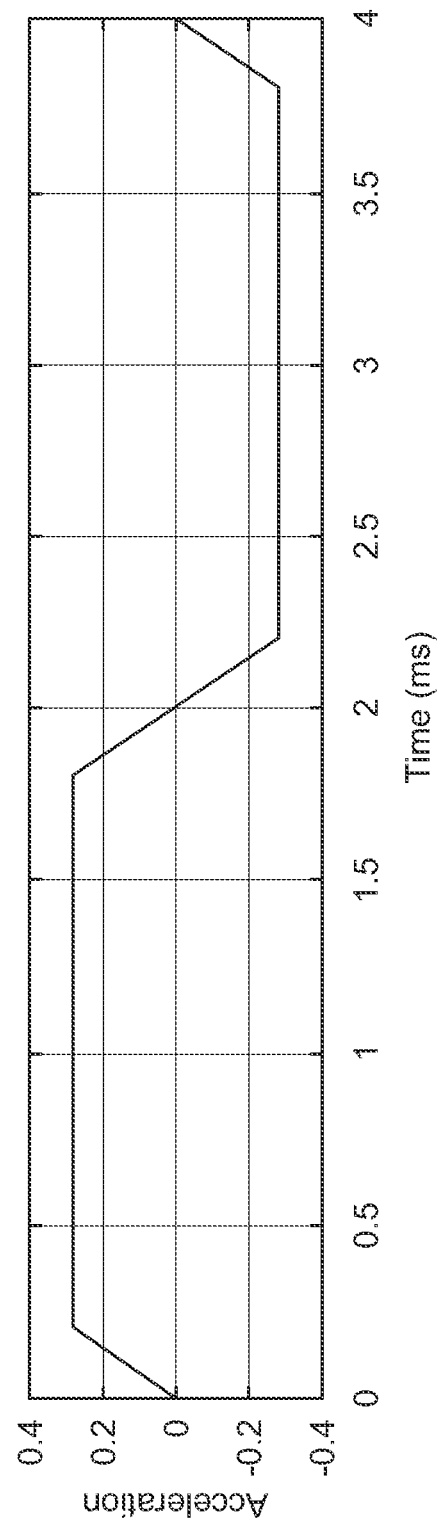

FIGS. 3D-F show graphs of position, velocity, and acceleration over time, respectively, for a linear ramp trajectory, in which the maximum value of jerk is limited. There are ramp portions before and after a steady acceleration portion where the acceleration changes linearly. Limiting the jerk or higher order derivatives may effectively suppress high frequency vibrations, like a higher order low-pass filter. The slope of the vibration amplitude about the frequency in this example is −20 dB/dec, −60 dB/dec, and −120 dB/dec for the velocity limit, jerk limit, and pop limit (where pop is the rate of change of jerk over time, or equivalently, the fourth derivative of position with respect to time), respectively.

2.3 Acceleration Trajectory with Polydyne Ramp

FIGS. 4A-F show graphs of position, velocity, and acceleration over time, respectively, for trajectories with example polydyne trajectory curves in accordance with aspects of this disclosure, or in which the ramp portions in the acceleration trajectory in FIGS. 3D-F are replaced with example polydyne trajectory curves in accordance with aspects of this disclosure. That is, the polydyne trajectory curves may show the indicated variables describing the control trajectory over time as defined by a trajectory control signal generated and outputted by control circuitry and applied to an actuator actuating a control object, such as a read/write head suspended over a disk surface. A polydyne curve may be described by a polynomial which is defined as follows.

Let $a_0(t)$ be a polynomial of acceleration with respect to time t defined at $0 \le t \le T_r$, and satisfy following conditions, at $t=0$, $$a_0(0) = \dot{a}_0(0) = \ddot{a}_0(0) = 0, \qquad \text{Equation 1}$$

and at $t = T_r$, $$a_0(T_r) = A_{max}, \dot{a}_0(T_r) = \ddot{a}_0(T_r) = 0, \qquad \text{Equation 2}$$

while $A_{max}$ is the maximum value of acceleration, and the first and second derivatives of $a_0(t)$ with respect to time are the jerk and the pop. If the order of the polynomial is fifth, its coefficients may be uniquely determined. With a natural frequency and damping ratio of a resonant mode to be suppressed are denoted by $\omega_n$ and $\zeta$, respectively, a polydyne curve to suppress transient vibrations related to the resonant mode may be given by, $$a(t) = a_0(t) + 2\zeta\omega_n^{-1}\dot{a}_0(t) + \omega_n^{-2}\ddot{a}_0(t). \qquad \text{Equation 3}$$

Moreover, if $a_0(t)$ is a ninth-order polynomial and it satisfies boundary conditions as follows, $$a_0(0) = \dot{a}_0(0) = \ddot{a}_0(0) = \dddot{a}_0(0) = \ddddot{a}_0(0) = 0, \qquad \text{Equation 4}$$

$$a_0(T) = A_{max}, \dot{a}_0(T) = \ddot{a}_0(T) = \dddot{a}_0(0) = \ddddot{a}_0(0) = 0, \qquad \text{Equation 5}$$

a polydyne curve obtained by Eq. (3) can also satisfy equations (1) and (2). By substituting the polydyne curve for $a_0$ in Eq. (3) again, another polydyne curve to suppress two resonant modes may be obtained, and it may be expressed as, $$a(t) = a_0(t) + 2(\zeta_1\omega_1^{-1} + \zeta_2\omega_2^{-1})\dot{a}_0(t) + (\omega_1^{-2} + \omega_2^{-2} + 4\zeta_1\zeta_2\omega_1^{-1}\omega_2^{-1})\ddot{a}_0(t) + 2(\zeta_1\omega_1^{-1}\omega_2^{-2} + \zeta_2\omega_1^{-2}\omega_2^{-2})\dddot{a}_0(t) + \omega_1^{-2}\omega_2^{-2}\ddddot{a}_0(t) \qquad \text{Equation 6}$$

while $\omega_1$, $\omega_2$ and $\zeta_1$, $\zeta_2$ denote natural frequencies and damping ratios of the two suppressed modes. Equations (1) to (3) and (4) to (6) give a curve to ramp up the acceleration from zero to maximum acceleration $A_{max}$, and it is point-symmetrical about its center. Curves for the other ramp portions can be obtained in the same way.

Control circuitry, such as of a disk drive, may thus specify a natural frequency and/or a damping ratio of one or more resonant modes to be suppressed, and may perform calculations in accordance herewith to generate one or more polydyne curves and to generate trajectory control signals that comprise polydyne acceleration ramp-ups and ramp-downs (polydyne acceleration ramps). While the polydyne curves calculated or generated as above are point-symmetrical, other examples may be non-point-symmetrical. In some examples, control circuitry may also superpose or combine a vibration cancelation component together with polydyne acceleration ramps, in some cases of which, the polydyne acceleration ramps may be non-point-symmetrical.

Thus, in the example of FIGS. 2A and 2B, disk drive 15 may comprise an actuator such as VCM 20; a control object such as any of heads 18, controlled by the actuator; and one or more processing devices, such as control circuitry 22, configured to perform positioning control of the control object via the actuator, wherein performing the positioning control may comprise generating a trajectory control signal for a trajectory that comprises a polydyne acceleration ramp, such as an acceleration ramp with a fifth-order polydyne curve in accordance with Equation 3 or with a ninth-order polydyne curve in accordance with Equation 6, and outputting the trajectory control signal to the actuator, in various examples in accordance with this disclosure.

The transient vibration in a one-degree-of-freedom (1-DOF) vibration system driven by an input force defined by f(t) at $0 \leq t \leq T_r$ may be expressed by using values of the input and its possible derivatives at the beginning and end as, $$x_{vib}(t) = \frac{1}{\omega_d}\Im\left[\sum_{k=0}^{N}\lambda^{-(k+1)}f^{(k)}(0)e^{\lambda t} - \sum_{k=0}^{N}\lambda^{-(k+1)}f^{(k)}(T_r)e^{\lambda(t-T_r)}\right].$$ Equation 7 while $\lambda$ and $\omega_d$ denote the complex natural frequency and the damped natural frequency of the system, $f^{(k)}(t)$ denotes the k-th order derivative of f(t), and $\Im[*]$ denotes the imaginary part of the term in the bracket. Since the curve is point-symmetrical, the complex coefficients associated with the even order derivatives at t=0 and $t=T_r$ have the same magnitude and phase, but ones of the odd order derivatives have the same magnitude and the opposite phase. The residual vibration is a vector sum of the transient vibrations at t=0 and $t=T_r$. The phase of the vibration generated at t=0 is advanced to the vibration generated at $t=T_r$ due to the natural frequency, and its magnitude is attenuated by the damping ratio. If the magnitudes of the two vibrations are equal and the phase is opposite, they are canceled with each other so that the residual vibrations are suppressed. Thus, the condition to cancel the vibrations may be expressed as, $$\sum_{k=0}^{N}\lambda^{-(k+1)}f^{(k)}(0) = e^{-\lambda T_r}\sum_{k=0}^{N}\lambda^{-(k+1)}f^{(k)}(T_r).$$ Equation 8

The relationship between ramp time $T_r$ and natural frequency of a mode to be suppressed can be obtained by Eq. (8), and it depends on the order of polynomial and the boundary conditions, which Eqs. (1) and (2) are for fifth-order polynomial and Eqs. (7) and (8) are for ninth-order polynomial. With the minimum value of ramp time normalized by the suppressed frequency denoted by $\kappa$, frequencies of vibrations to be canceled $\omega_c$ may be expressed as, $$\omega_c = \frac{2\pi}{T_r}(\kappa + n),$$ Equation 9 with an integer $n \geq 0$. The normalized ramp time K and the boundary conditions for polynomials are summarized in Table 1.

While illustrative examples of fifth-order and ninth-order polydyne acceleration ramps are described and discussed herein, other aspects of this disclosure may comprise polydyne acceleration ramps having a variety of other orders without limit within the principles of this disclosure.

FIGS. 3A-F show position, velocity, and acceleration, respectively, over time, of an acceleration trajectory when the position is moved from zero to $1\times10^{-6}$ meters (one micron) in 4 milliseconds (ms) (with position graphed from zero to one microns, velocity shown in hundreds of microns per second, and acceleration in tenths of meters per second). FIGS. 3A-C show position, velocity, and acceleration, respectively, over time, for no ramp: trajectories in which the acceleration changes instantaneously at 0, 2, and 4 ms. FIGS. 3D-F show position, velocity, and acceleration, respectively, over time, for a linear ramp: jerk is kept constant in the ramp portions which the acceleration changes linearly. The acceleration ramp time is 0.2 ms to suppress vibration at 5000 Hz.

Figure 4A:
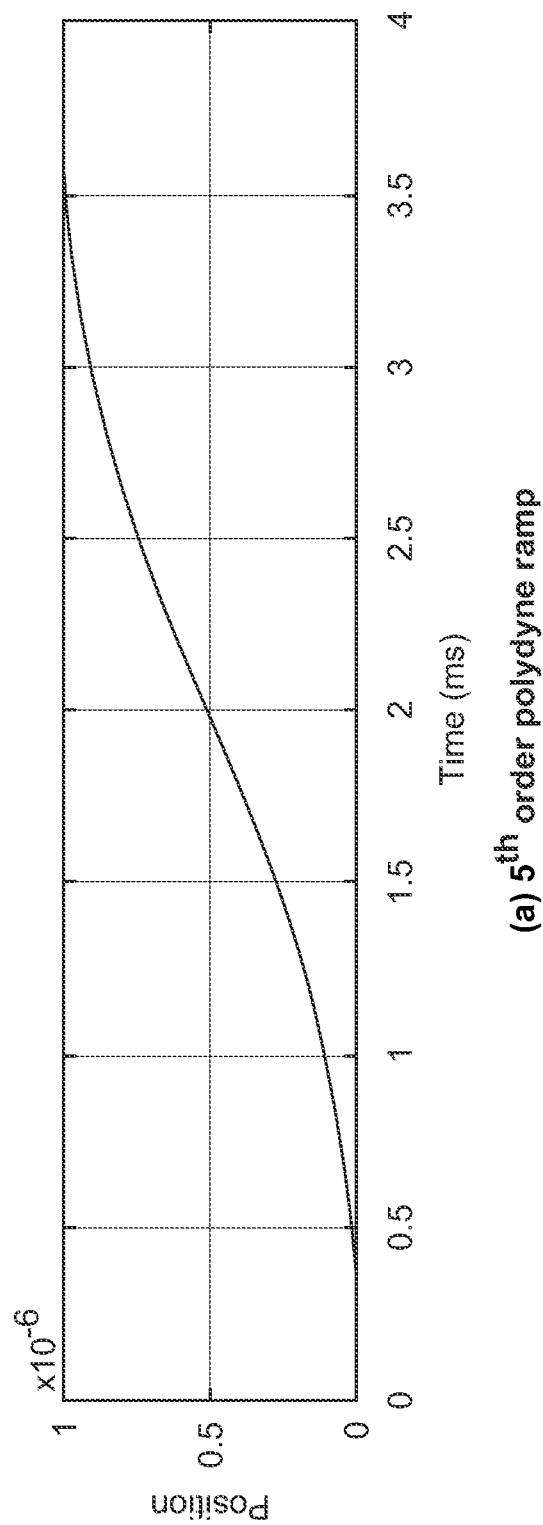
FIGS. 4A-F show graphs of position, velocity, and acceleration over time, respectively, for trajectories with example polydyne trajectory curves in accordance with aspects of this disclosure.
Figure 4B:
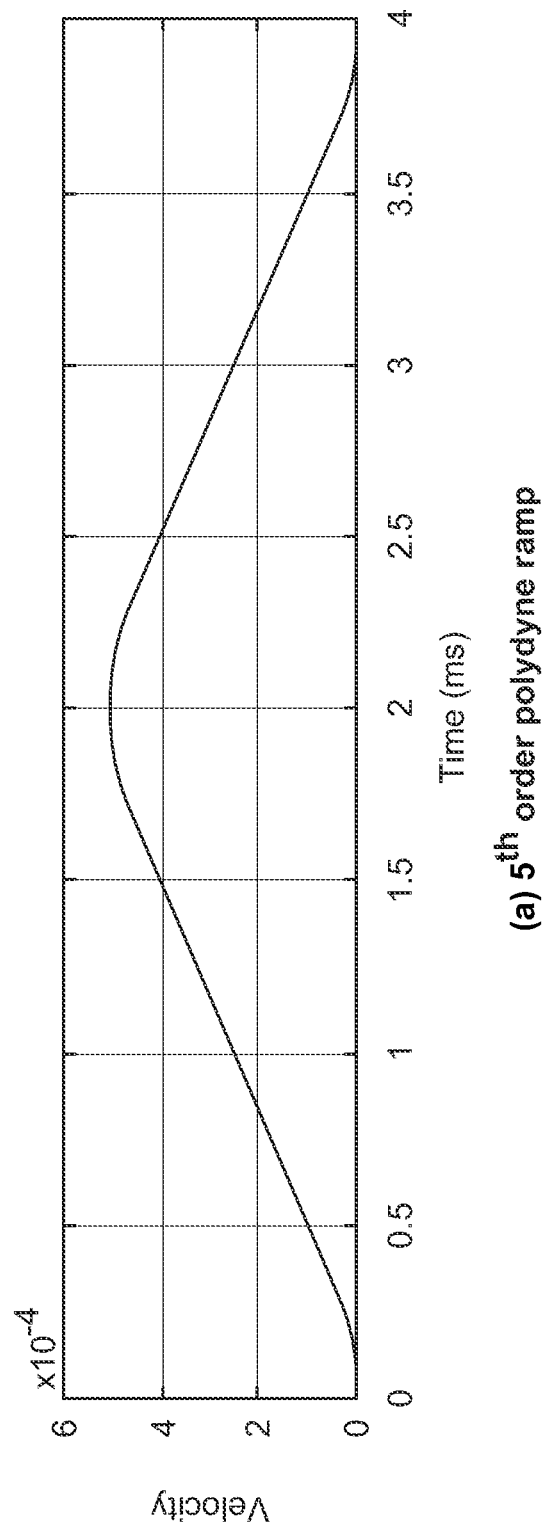
Figure 4C:
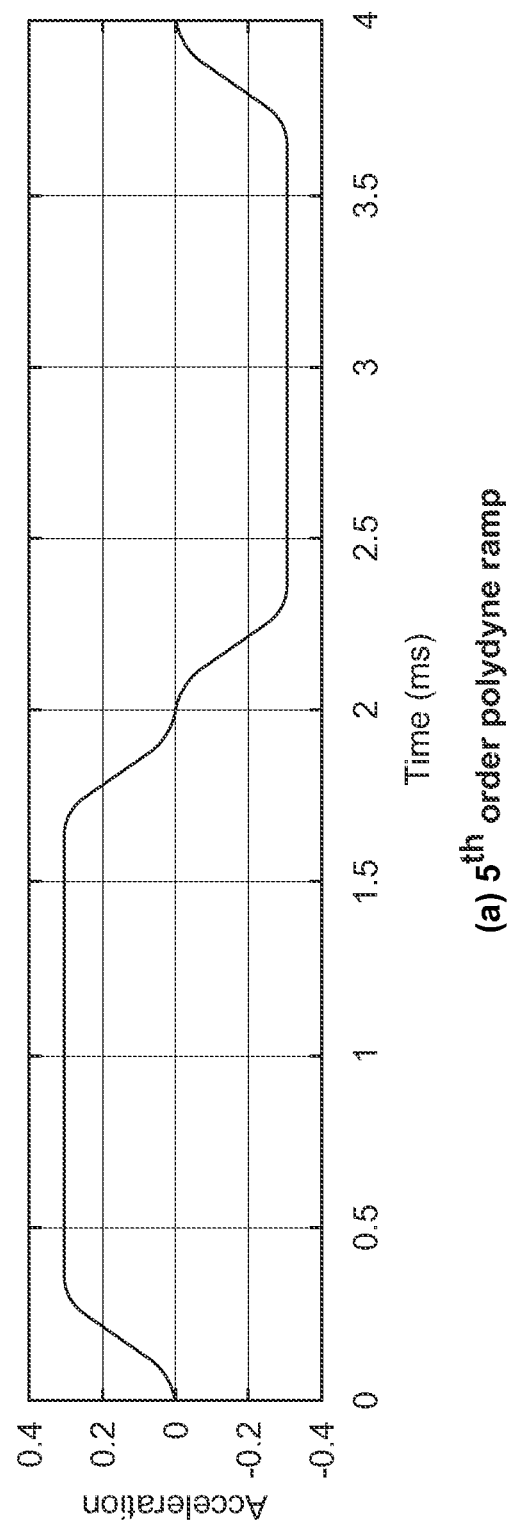
Figure 4D:
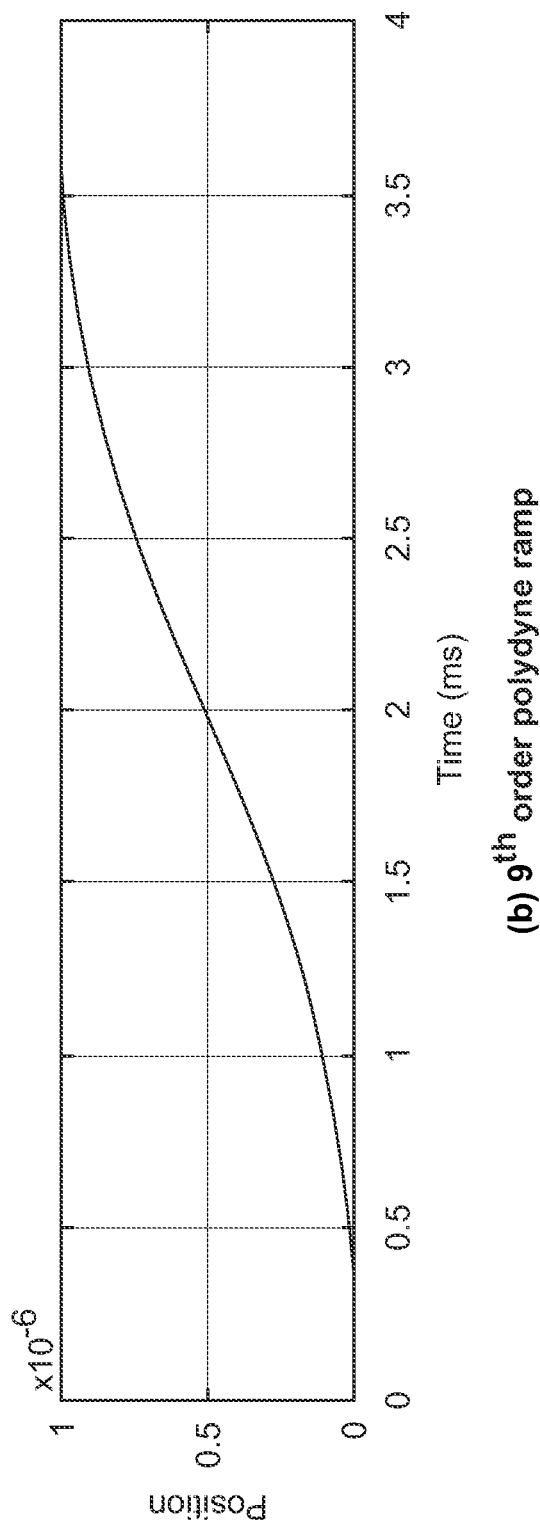
Figure 4E:
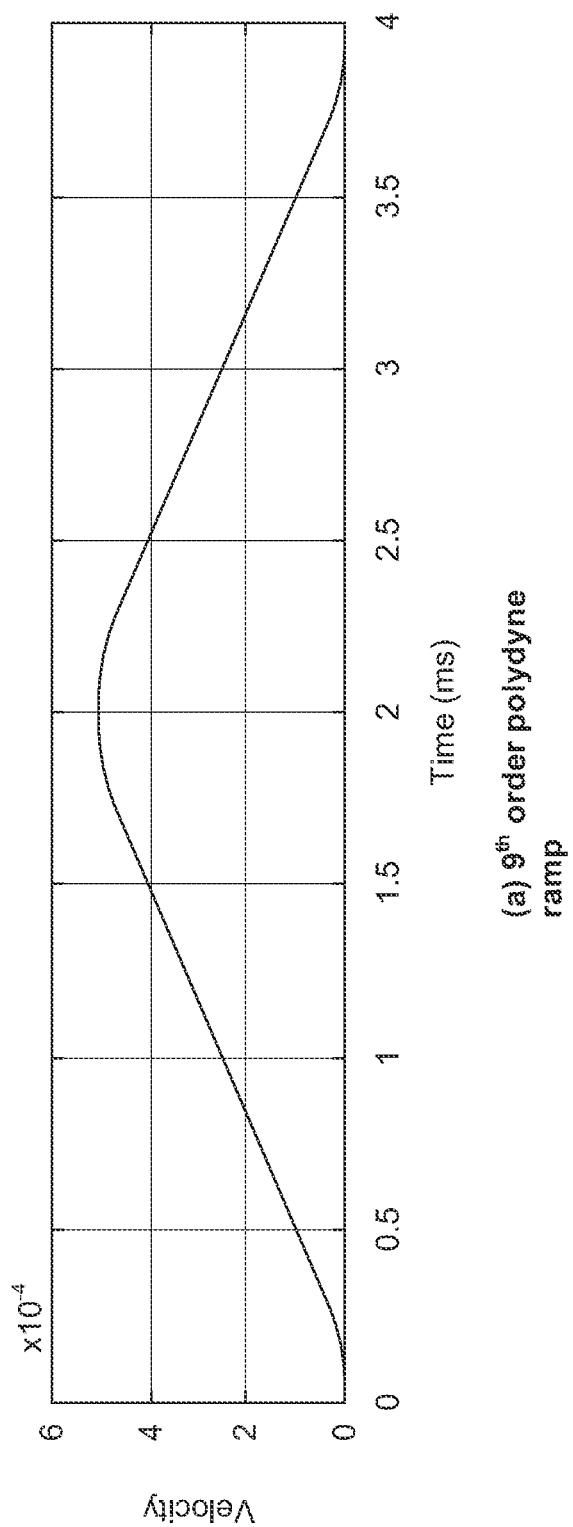
Figure 4F:
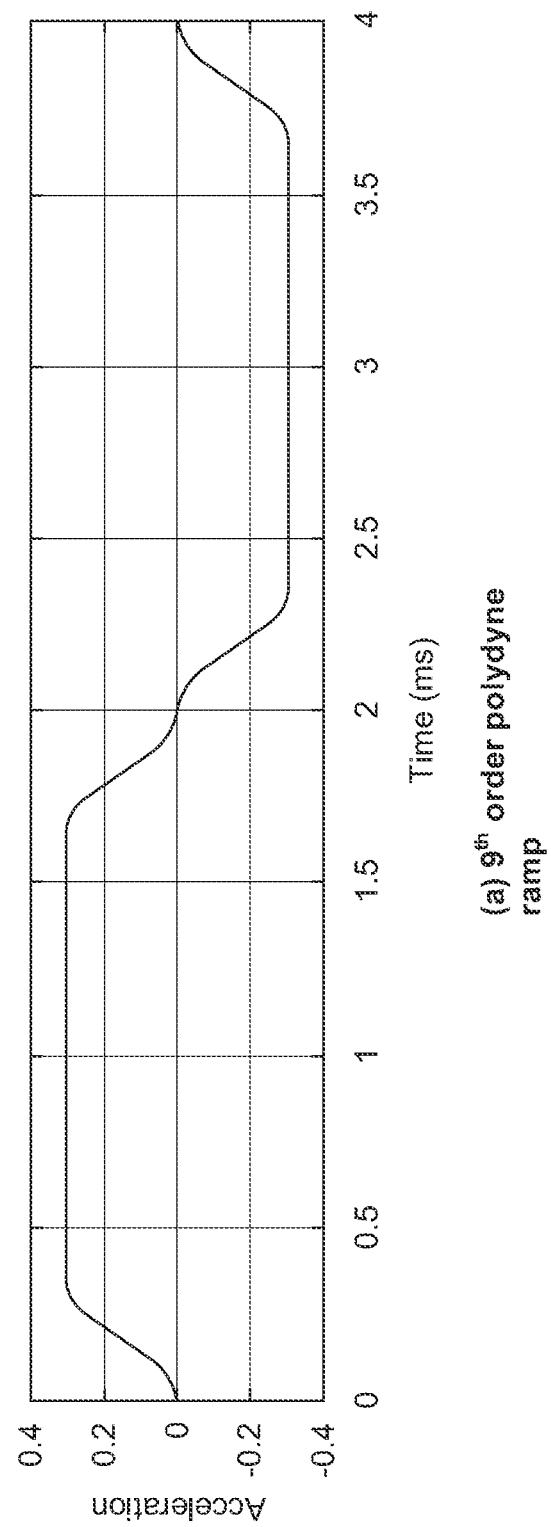

FIGS. 4A-F show position, velocity, and acceleration, respectively, over time, of acceleration trajectories of feed-forward inputs using a polydyne curve. The distance and time to move are the same as in the examples of FIGS. 3A-F. FIGS. 4A-C show position, velocity, and acceleration, respectively, over time, for a fifth-order polydyne ramp, designed to suppress a resonant mode whose natural frequency is 6000 Hz and damping ratio is 0.005. FIGS. 4D-F show position, velocity, and acceleration, respectively, over time, for a ninth-order polydyne ramp, designed to suppresses two modes whose natural frequencies are 6000 Hz and 9000 Hz and damping ratios are both 0.005. The acceleration ramp times are 0.368 ms to suppress vibration at 6000 Hz, as shown in FIG. 4C, and 0.52 ms to suppress vibration at 6000 Hz and 9000 Hz, as shown in FIG. 4F.

3. Simulations 3.1 Vibration Suppression by Proposed Trajectories

A mechanical vibration model that has three resonant modes is considered in this section. Its continuous-time transfer function is given as follows, $$G(s) = K_p \sum_{i=1}^{3} \frac{\alpha_i}{s^2 + 2\zeta_i\omega_i s + \omega_i^2}.$$ Equation 10

The values of modal parameters are listed in Table 2. The frequency response at $K_p=1$ is shown in FIGS. 5A and 5B.

TABLE 1

Normalized ramp time and boundary conditions for example polynomials

| Order of polynomial | Normalized ramp time κ | Boundary conditions |
|---|---|---|
| 1 | 1 | $\alpha_0(0) = 0$, $\alpha_0(T_r) = A_{max}$ |
| 3 | 1.43 | $\alpha_0(0) = \dot{\alpha}_0(0) = 0$, $\alpha_0(T_r) = A_{max}, \dot{\alpha}_0(T_R) = 0$ |
| 5 | 1.84 | $\alpha_0(0) = \dot{\alpha}_0(0) = \ddot{\alpha}_0(0) = 0$, $\alpha_0(T_r) = A_{max}, \dot{\alpha}_0(T_r) = \ddot{\alpha}_0(Tr) = 0$ |
| 7 | 2.22 | $\alpha_0(0) = \dot{\alpha}_0(0) = \ddot{\alpha}_0(0) = \dddot{\alpha}_0(0) = 0$, $\alpha_0(T_r) = A_{max}, \dot{\alpha}_0(T_r) = \ddot{\alpha}_0(T_r) = \dddot{\alpha}_0(T_r) = 0$ |
| 9 | 2.60 | $\alpha_0(0) = \dot{\alpha}_0(0) = \ddot{\alpha}_0(0) = \dddot{\alpha}_0(0) = \ddddot{\alpha}_0(0) = 0$, $\alpha_0(T_r) = A_{max}, \dot{\alpha}_0(T_r) = \ddot{\alpha}_0(T_r) = \dddot{\alpha}_0(T_r) = \ddddot{\alpha}_0(T_r) = 0$ |
| 11 | 2.98 | $\alpha_0(0) = \dot{\alpha}_0(0) = \ddot{\alpha}_0(0) = \dddot{\alpha}_0(0) = \ddddot{\alpha}_0(0) = \alpha_0^{(5)}(0) = 0$, $\alpha_0(T_r) = A_{max}, \dot{\alpha}_0(T_r) = \ddot{\alpha}_0(T_r) = \dddot{\alpha}_0(T_r) = \ddddot{\alpha}_0(T_r) = \alpha_0^{(5)}(T_r) = 0$ |

TABLE 2

Modal parameters of the example mechanical vibration model

| | Frequency (rad/sec) $\omega_i$ | Damping ratio $\zeta_i$ | Gain $\alpha_i$ |
|---|---|---|---|
| Mode-1 | $2\pi \times 5000$ | 0.03 | −1 |
| Mode-2 | $2\pi \times 6000$ | 0.005 | 0.2 |
| Mode-3 | $2\pi \times 9000$ | 0.005 | −0.3 |

FIGS. 5A and 5B show the frequency response of a mechanical vibration model which has three resonance modes. FIG. 5A shows the gain in decibels (dB) and FIG. 5B shows the phase in degrees.

TABLE 3

Parameters of the example acceleration trajectories

| Trajectory # | Max. accel. $A_{max}$ | Ramp time (ms) $T_r$ | Frequency (rad/s) $\omega_1$ | Damping ratio $\zeta_1$ | Frequency (rad/s) $\omega_z$ | Damping ratio $\zeta_z$ |
|---|---|---|---|---|---|---|
| 1 | 0.25 | — | — | — | — | — |
| 2 | 0.278 | 0.2 | — | — | — | — |
| 3 | 0.306 | 0.368 | $2\pi \times 6000$ | 0.005 | — | — |
| 4 | 0.338 | 0.52 | $2\pi \times 6000$ | 0.005 | $2\pi \times 9000$ | 0.005 |

The simulations considered only feedforward control in continuous-time domain but no feedback control, thus the residual vibration of the mechanical model was calculated by using the acceleration trajectories shown in FIGS. 3A-F and FIGS. 4A-F as input forces. The trajectories shown in FIGS. 3A-C, FIGS. 3D-F, FIGS. 4A-C and FIGS. 4D-F may be referred to as Trajectory-1, 2, 3, and 4, respectively, and their maximum values of acceleration, time duration of ramp portions, natural frequency, and damping ratios used in generating the polydyne curve, are listed in Table 3. The time-historical responses of the mechanical model were calculated by using the 'lsim' function of Matlab, which translates a given continuous-time transfer function into discrete-time by first-order hold and calculates historical response as a filter. The time step in the simulations was $1 \times 10^{-6}$ seconds (microseconds), and the time-historical response of the mechanical model was calculated by each mode. The time-historical response of a 1-DOF system driven by an input force f(t) is written as a sum of a vibration part and a non-vibration part. The non-vibration part is called as an equivalent displacement and expressed as $$x_{eq}(t) = \frac{1}{\omega_d} \Im\left[-\sum_{k=0}^{N} \lambda^{-(k+1)} f^{(k)}(t)\right],$$

Equation 11 while $\lambda$ and $\omega_d$ denote the complex natural frequency and the damped natural frequency of the system. The vibration response was obtained by subtracting the equivalent displacement in Eq. (11) from the historical response of the mechanical model. FIGS. 6A-6M show the vibration response of each resonant modes. The input force was applied at the duration from 0 ms to 4 ms. The damped free vibration after 4 ms may be referred to as the residual vibration.

FIGS. 6A-6L show the vibration responses of each mode in the mechanical model when the acceleration trajectory shown in FIGS. 3A-F and FIGS. 4A-F is applied to the model as input force are shown. The frequencies and damping ratios of mode-1 through 3 are listed in Table 2. The time length of input force (move time) is 4 milliseconds in all cases.

Figure 6A:
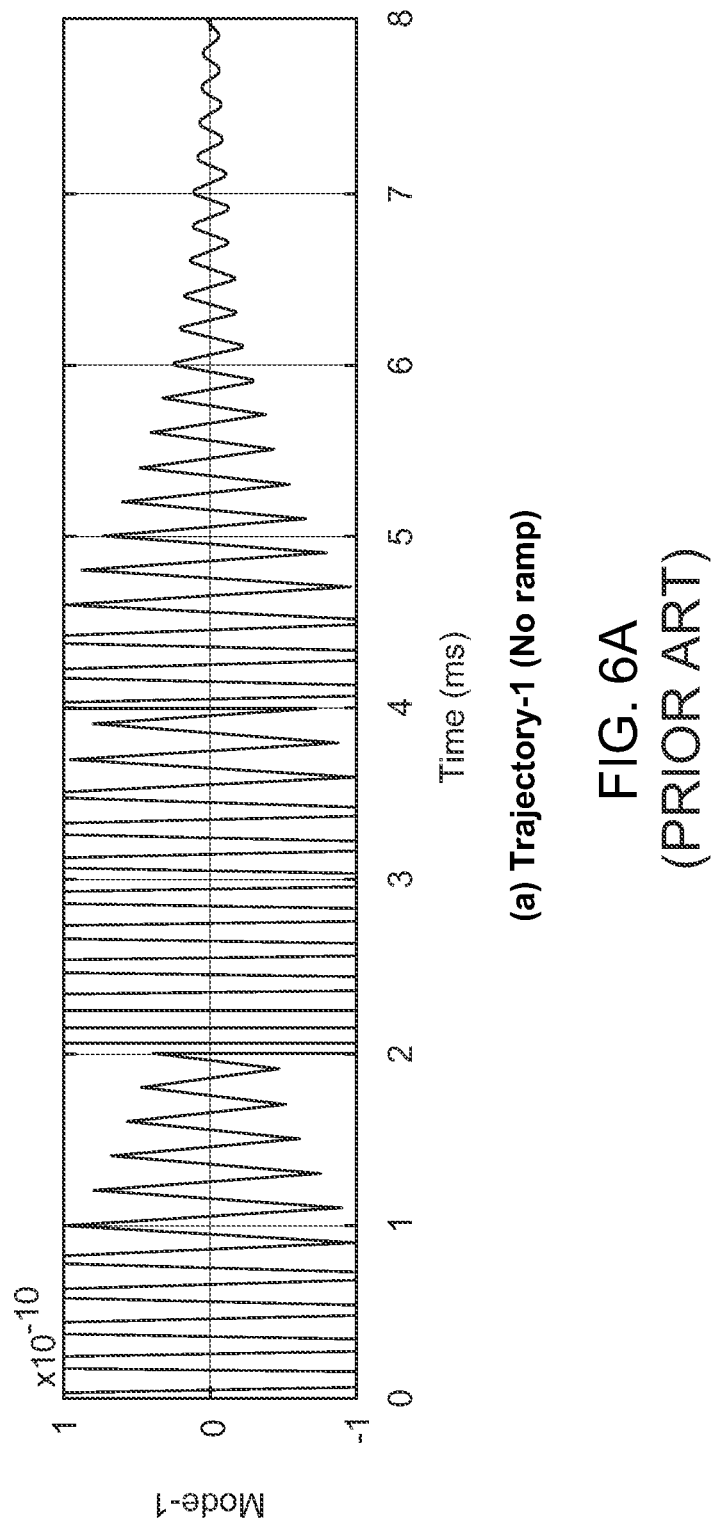
Figure 6B:
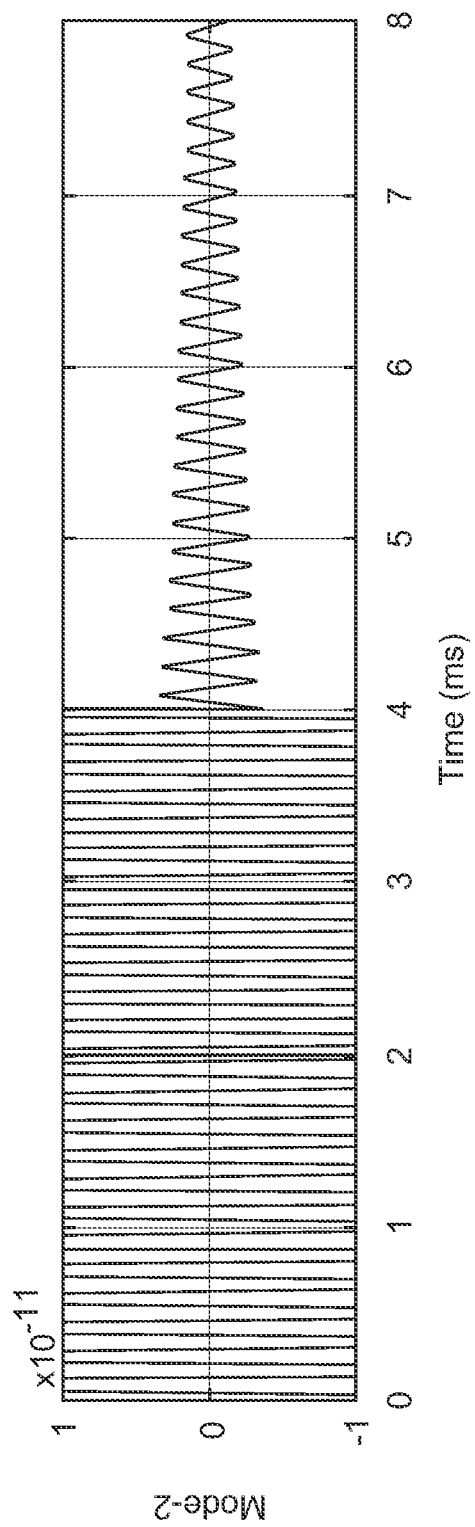
Figure 6C:
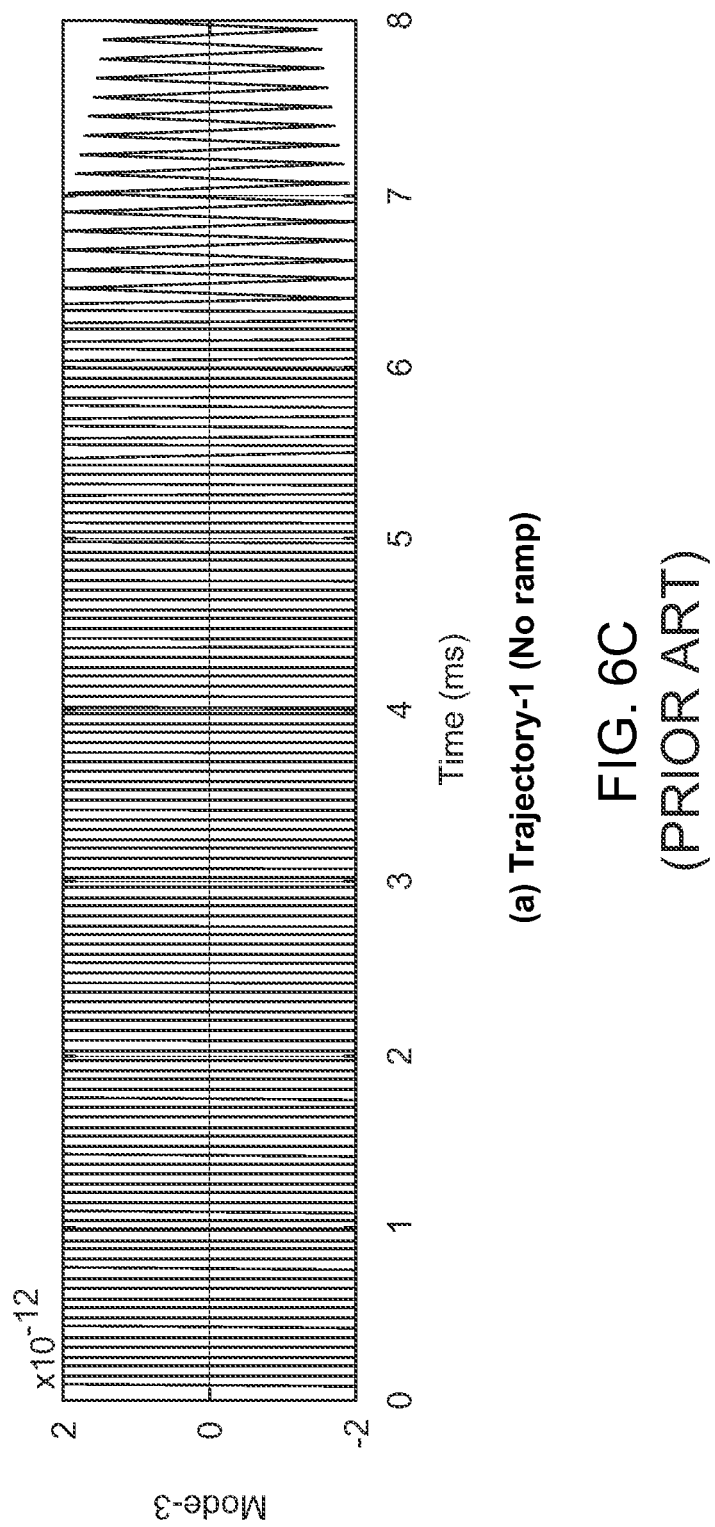
Figure 6D:
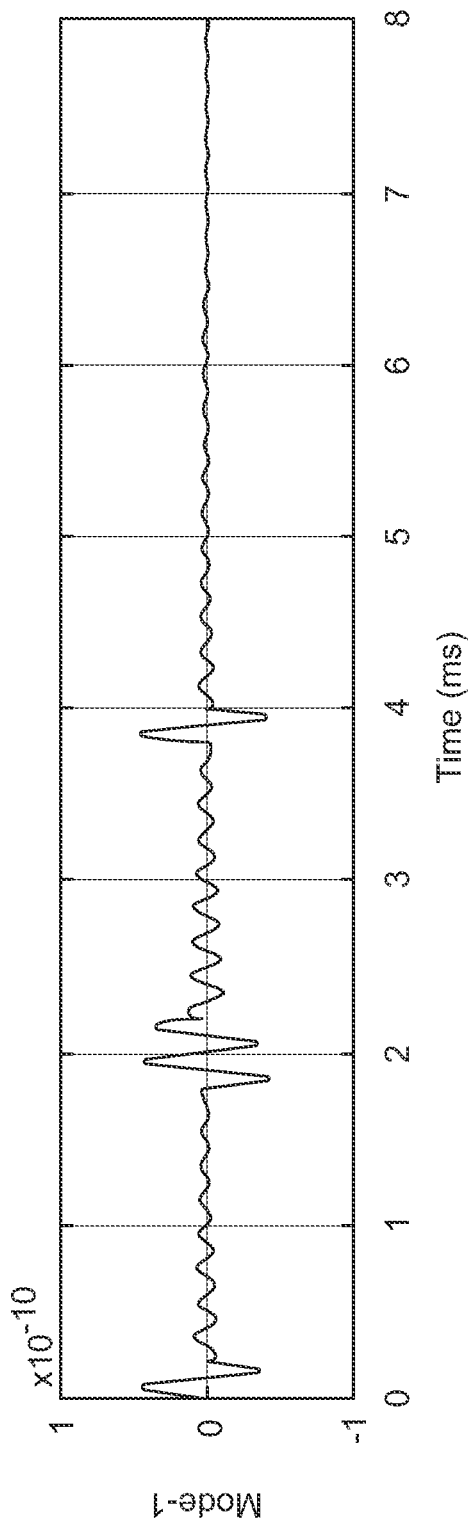
Figure 6E:
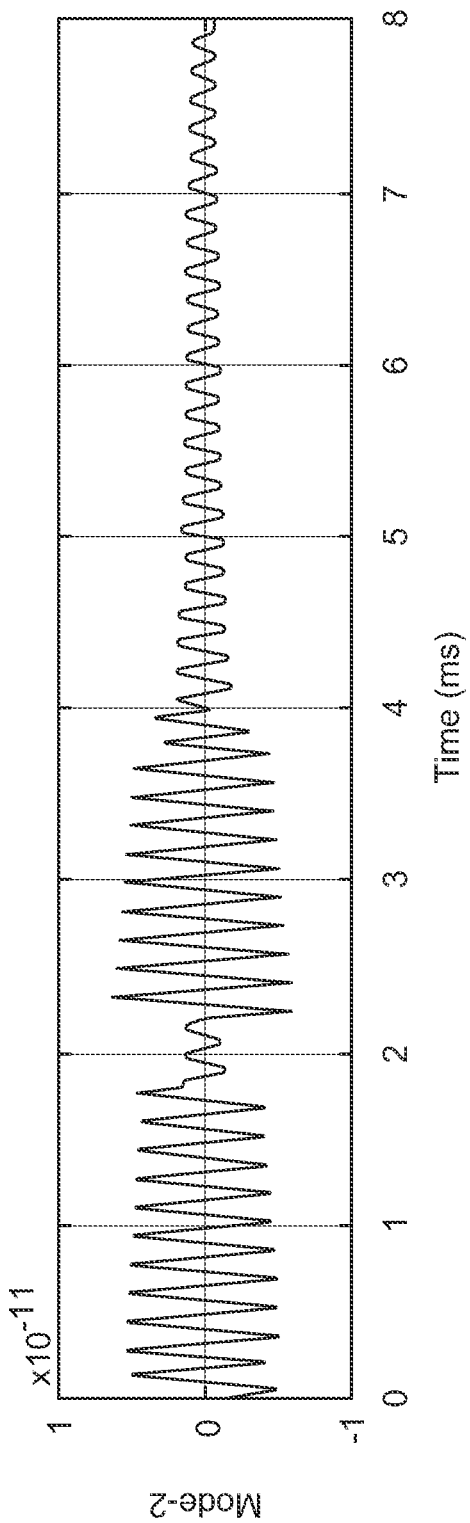
Figure 6F:
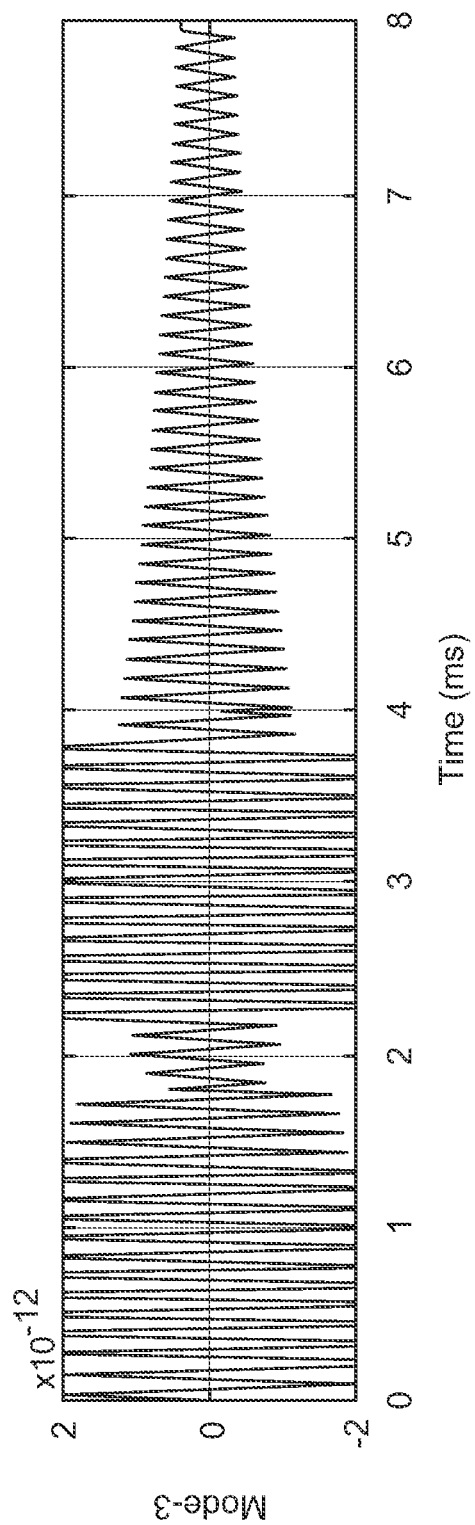
Figure 6G:
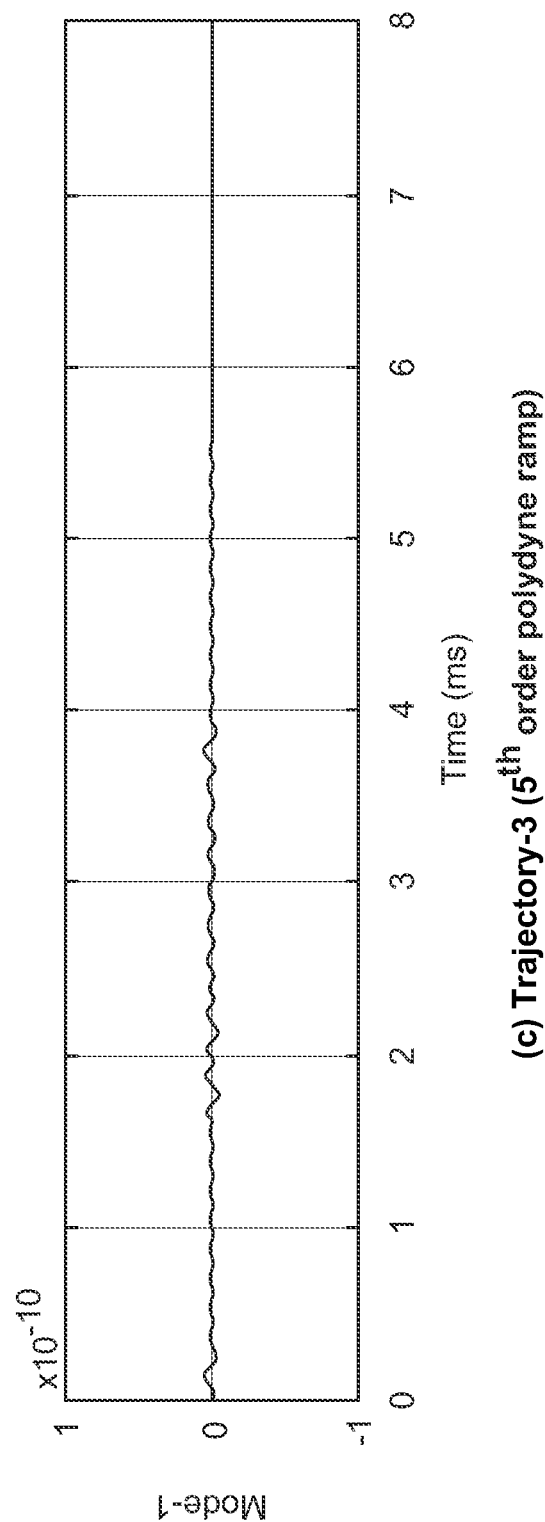
Figure 6H:
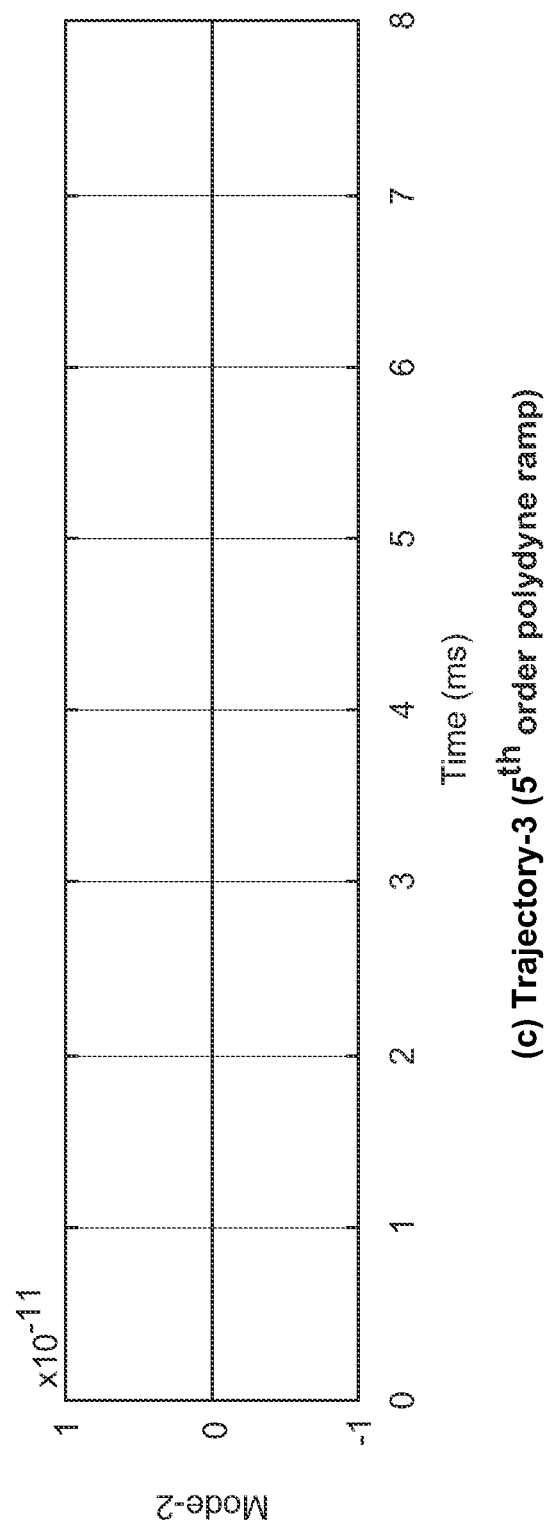
Figure 6I:
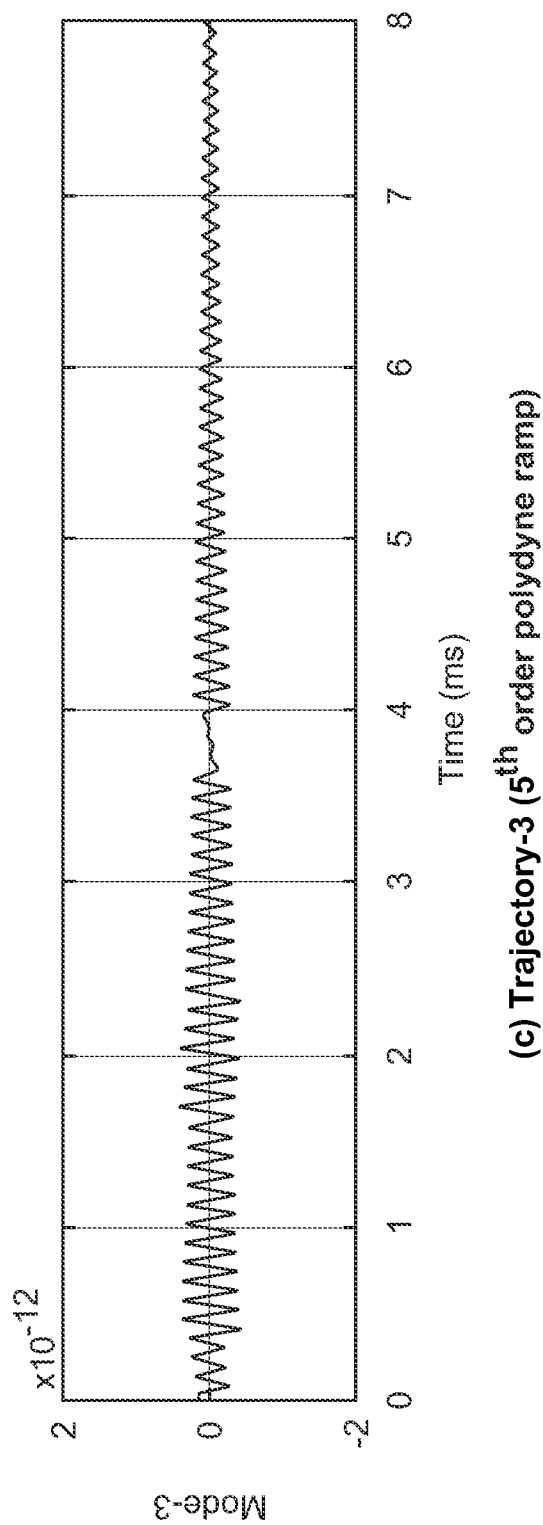
Figure 6J:
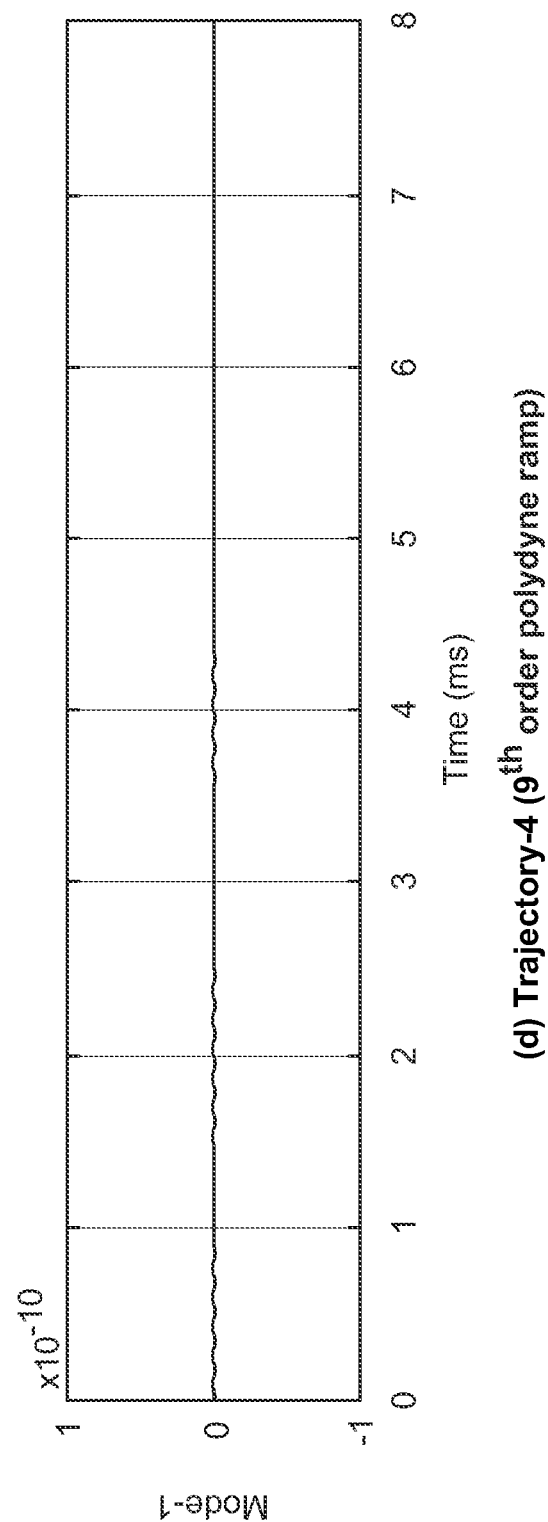
Figure 6K:
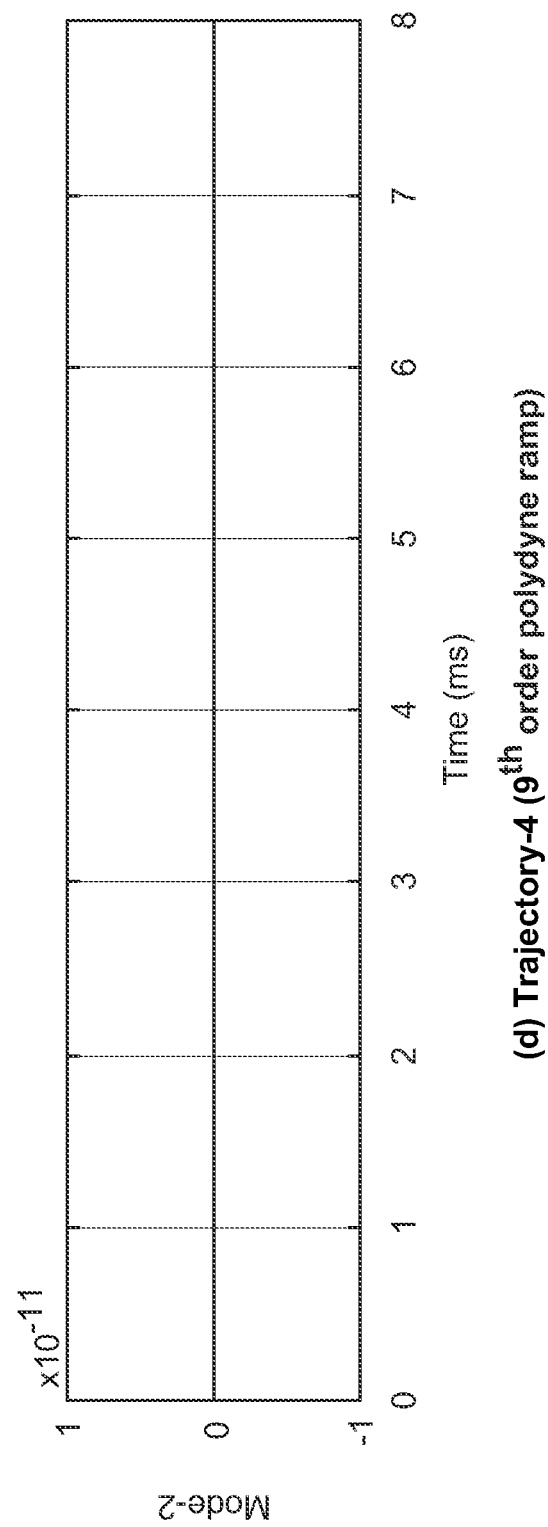
Figure 6L:
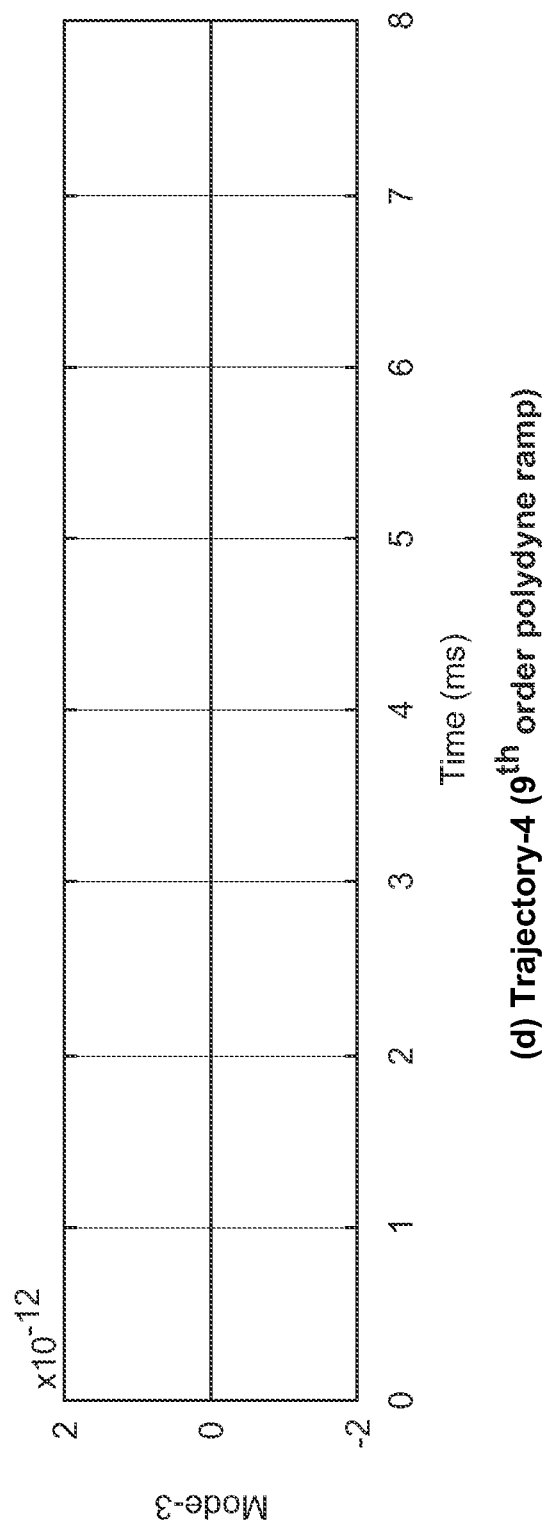

FIGS. 6A-6C show the vibration responses of mode-1, mode-2, and mode-3, respectively, against the acceleration trajectory with no ramp. Large vibrations were generated in all modes. The residual vibration of mode-1 was attenuated rapidly by its large damping ratio. The vibration of the mode-2 was smaller than ones of mode-1 and mode-3. This was because transient vibrations generated at 0 ms, 2 ms, and 4 ms canceled with each other. FIGS. 6D-6F show the vibration responses of mode-1, mode-2, and mode-3, respectively, against the trajectory with linear ramp. The large response of mode-1 appeared only in the ramp portions. This means the vibration generated at the beginning of the ramp portion was canceled quickly at the end of the ramp portion. FIGS. 6G-6I show the vibration responses of mode-1, mode-2, and mode-3, respectively, against the trajectory with an example fifth-order polydyne ramp, in accordance with aspects of this disclosure. The vibration of mode-2 disappeared completely. This means that no vibration was generated at both the beginning and end of ramp portion. FIGS. 6J-6L show the vibration responses of mode-1, mode-2, and mode-3, respectively, against the trajectory with an example ninth-order polydyne ramp, in accordance with aspects of this disclosure. Vibrations of all the three modes were completely suppressed.

3.2 Relationship Between Residual Vibration and Natural Frequency

A 1-DOF vibration system was used in this section to study the relationship between the residual vibration amplitude and the natural frequency of system. The transfer function of the system may be expressed as, $$G_1(s) = (s^2 + 2\zeta\omega_n s + \omega_n^2)^{-1}, \qquad \text{Equation 12}$$

and vibration responses by using the Trajectory-1 to 4 as input force were calculated in analogous ways as in the previous section. The amplitude of the residual vibration was defined as its maximum value after 4 ms, and it was calculated when the natural frequency of system changed from 1000 Hz to 20000 Hz and the damping ratio was fixed at 0.01.

Figure 7A:
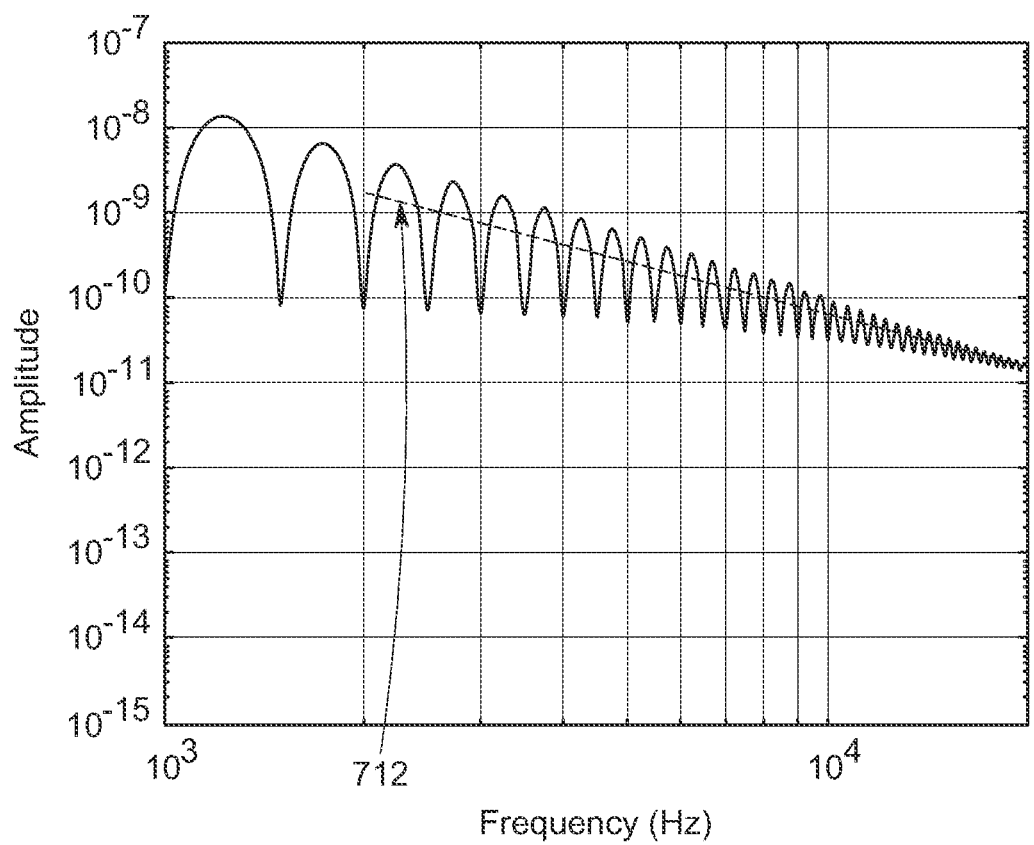
FIGS. 7A-7D show residual vibration spectra, which show the relationships between the amplitudes of residual vibration and natural frequencies of the system, for no ramp, linear ramp, fifth-order polydyne ramp, and ninth-order polydyne ramp, respectively.
Figure 7B:
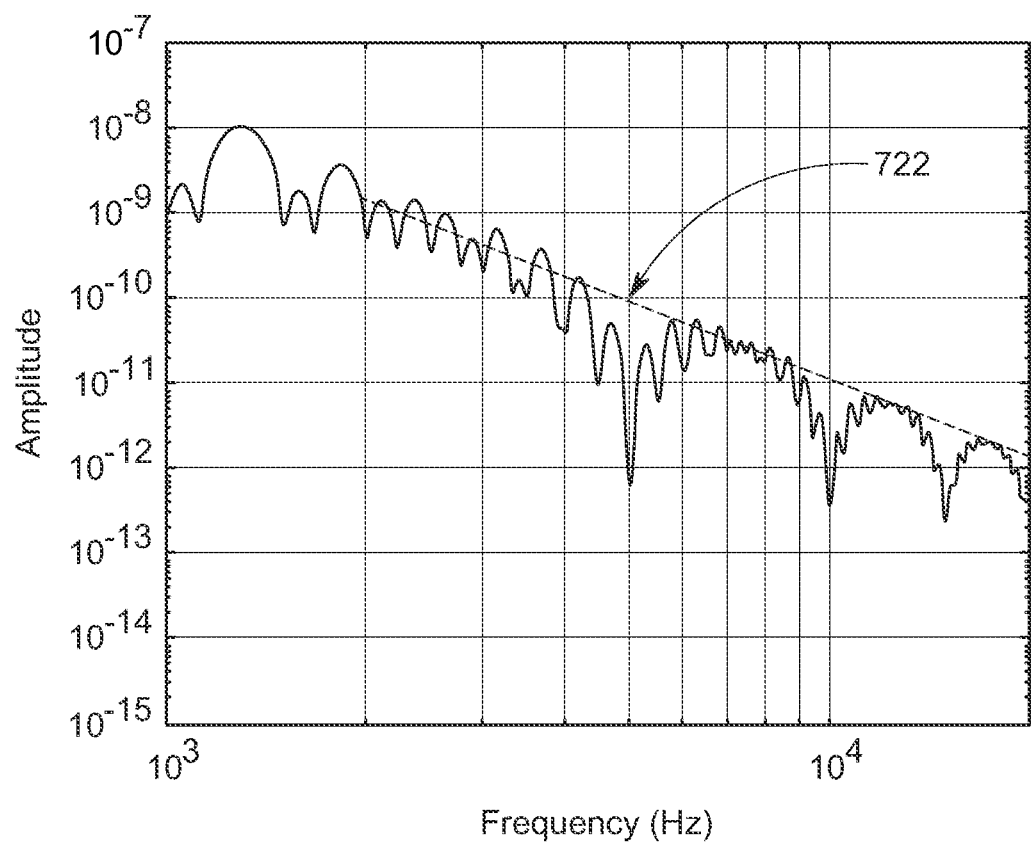
Figure 7C:
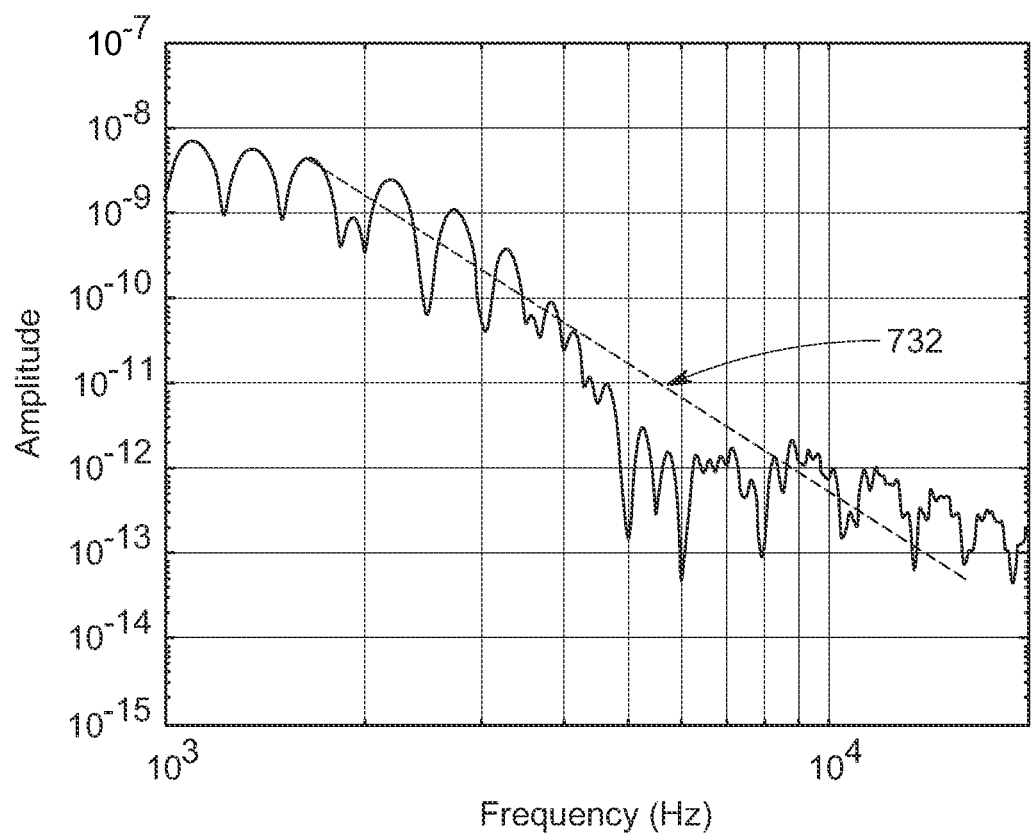
Figure 7D:
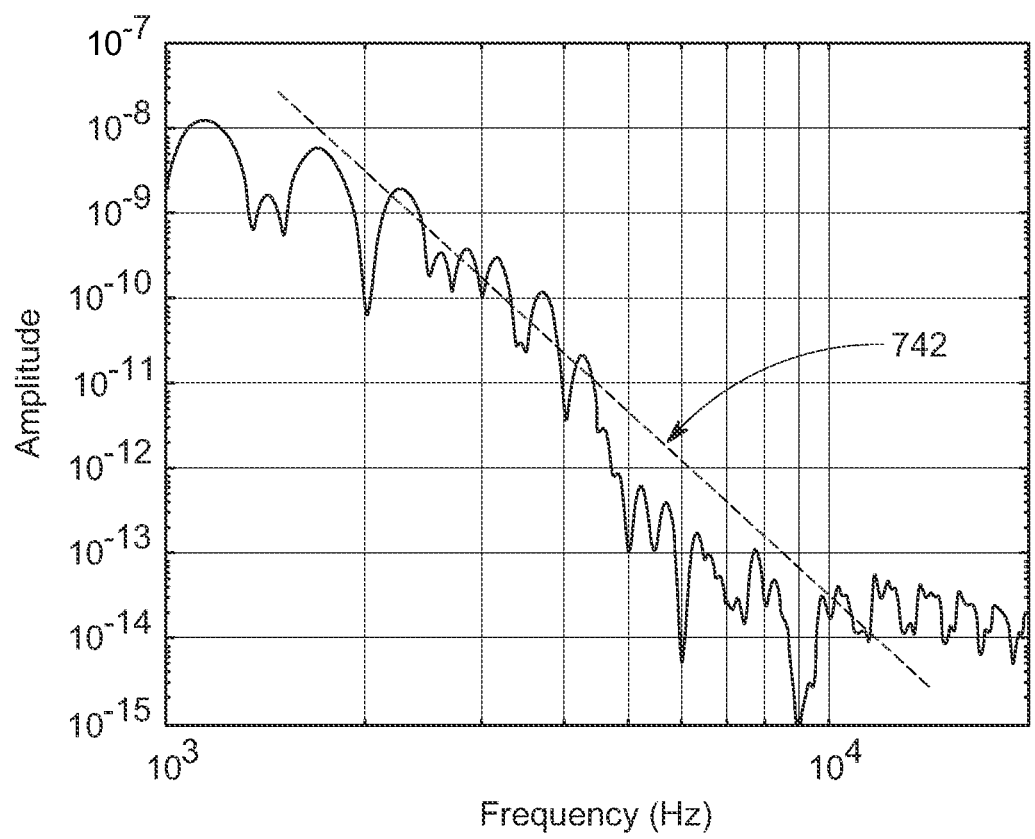

FIGS. 7A-7D show residual vibration spectra, which show the relationships between the amplitudes of residual vibration and natural frequencies of the system, for no ramp, linear ramp, fifth-order polydyne ramp, and ninth-order polydyne ramp, respectively. FIG. 7A shows that the residual vibration spectrum of Trajectory-1, with no ramp, is hardly attenuated in the high frequencies. FIG. 7B shows that the residual vibration spectrum of Trajectory-2, with a linear ramp, has notches at 5 kHz, 10 kHz, 15 kHz, and 20 kHz, due to the ramp time, which is consistent with Eq. (9) in cases in which the order of polynomial is one. FIG. 7C shows that the residual vibration spectrum of Trajectory-3, with a fifth order polydyne ramp in accordance with aspects of this disclosure, has a deep notch at 6 kHz due to the polydyne ramp. FIG. 7C also shows that there are other notches due to ramp time at 5 kHz, 8 kHz, 10.5 kHz, 13.5 kHz, and so on, which are approximated by Eq. (9) in the case of a fifth-order polydyne curve, but not exactly the same. FIG. 7D shows that the residual vibration spectrum of Trajectory-4, with a ninth order polydyne ramp in accordance with aspects of this disclosure, has deep notches due to the designed polydyne ramp curves at 6 kHz and 9 kHz. FIG. 7D also shows other notches due to ramp time that appear at 5 kHz, 7.2 kHz, 11 kHz, 13 kHz, and so on, which are also approximated by Eq. (9), but are not exactly same either.

The slopes of the dashed trend lines 712, 722, 732, 742 in FIGS. 7A-7D, respectively, which are theoretically predicted by Eq. (7), are −40 dB/dec, −60 dB/dec, −100 dB/dec, and −140 dB/dec, for no ramp and for the linear, fifth-order polydyne, and ninth-order polydyne ramps, respectively. At the frequencies higher than the frequencies designed to be suppressed by the effect of polydyne curves of the present disclosure in FIGS. 7C and 7D, the amplitude of residual vibration became larger than the theoretical expectation indicated by the dashed trend lines 732 and 742, respectively. They also showed that it may be a reasonable option to let the damping ratio be zero in designing the polydyne ramp curves.

3.3 Relationship Between Residual Vibration and Damping Ratio

Figure 8A:
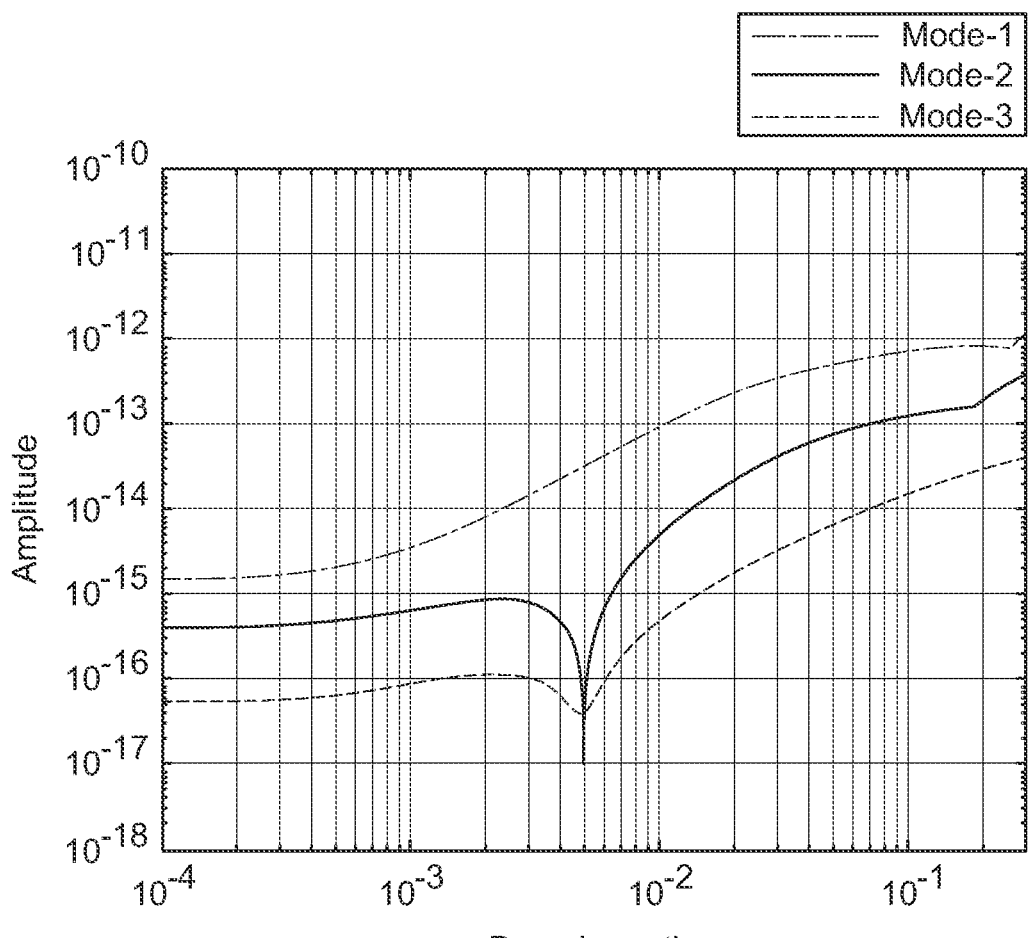
FIGS. 8A and 8B show the amplitudes of residual vibrations of three modes against a trajectory with a ninth-order polydyne ramp with respect to the damping ratio.
Figure 8B:
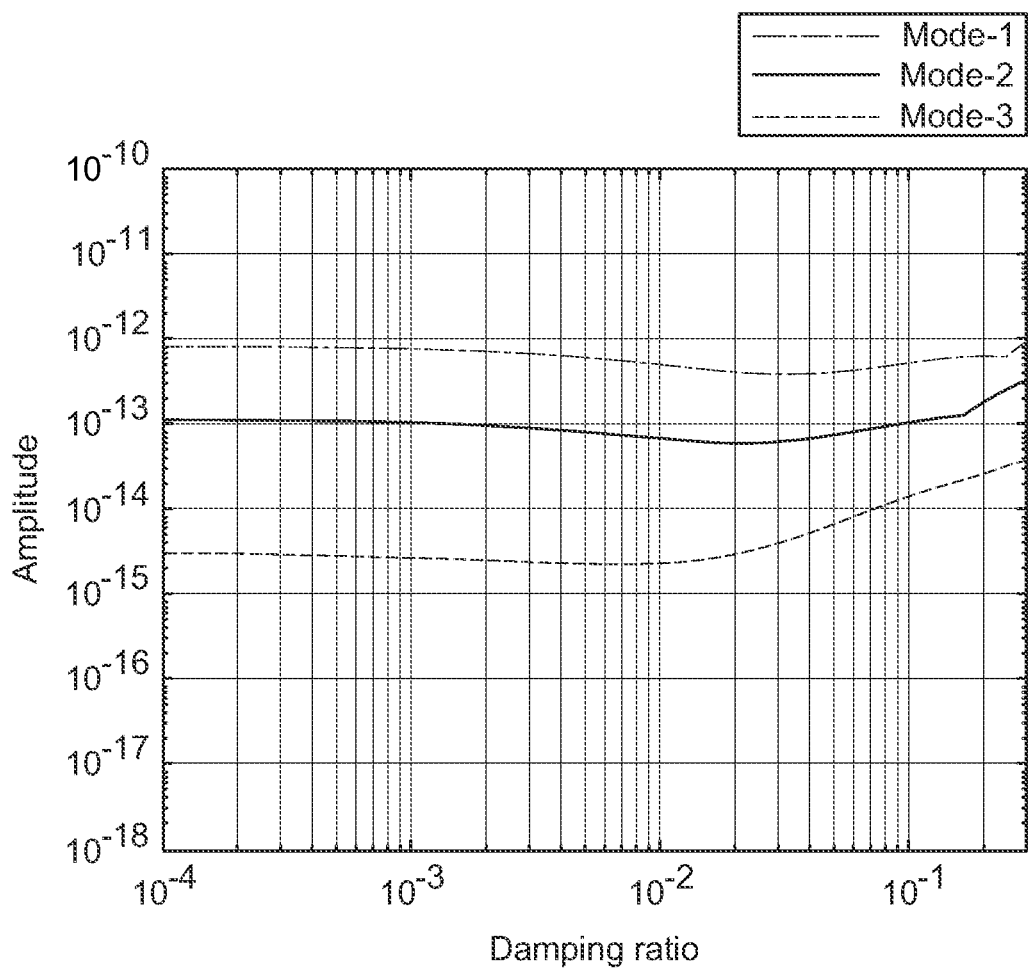

The amplitude of residual vibration was calculated when the damping ratio of system changed from 0.0001 to 0.3 in this section. The input force is the Trajectory-4, with a 9th order polydyne ramp in accordance with aspects of this disclosure, and the system frequency was fixed at each of mode-1 to 3 in Table 2. The relationship between residual vibration amplitude and damping ratio are shown in FIGS. 8A and 8B. FIG. 8A shows the case in which the system frequencies were exactly same as in Table 2, and FIG. 8B shows the case in which the system frequencies were higher by 3% than them. In FIG. 8A, the spectra of mode-2 and 3 has a notch where the damping ratio is 0.005, which is the value used in generating the polydyne curve. In FIG. 8B, on the other hand, the spectra rose at low damping ratios and the notches in mode-2 and 3 disappeared, and they were almost even about damping ratios. Considering the actual system must have some uncertainties on its natural frequencies, assuming and using a damping ratio of zero in generating a polydyne curve may not provide any disadvantage to the performance of a feedforward controller in some contexts, and may be reasonable in terms of robust design. Using a damping ratio of zero may also simplify parts of the calculations for generating the polydyne acceleration ramps, and so may reduce computational burden and time in some examples.

FIGS. 8A and 8B show the amplitudes of residual vibrations of three modes against the Trajectory-4 (ninth-order polydyne ramp) with respect to the damping ratio. FIG. 8A shows the system frequencies as designed. When the frequencies of three modes are exactly the same as in Table 2, the spectra of mode-2 and 3 have a notch at which the damping ratio is 0.005. FIG. 8B shows that when the frequencies are 3% higher than the designed ones as in Table 2, the notch disappears, and the residual vibration spectra rose at the low damping ratios.

3.4 Polydyne Curve to Suppress a Resonant Mode at 2 kHz

In the sections above, the frequency of resonant mode to be suppressed by the effect of polydyne curve was equal or higher than the inverse of ramp time. Meanwhile, this section discusses characteristics of the residual vibration spectrum of the trajectory with a fifth-order polydyne ramp in accordance with aspects of this disclosure to suppress a resonant mode at 2 kHz, which is much smaller than the inverse of ramp time.

Figure 9A:
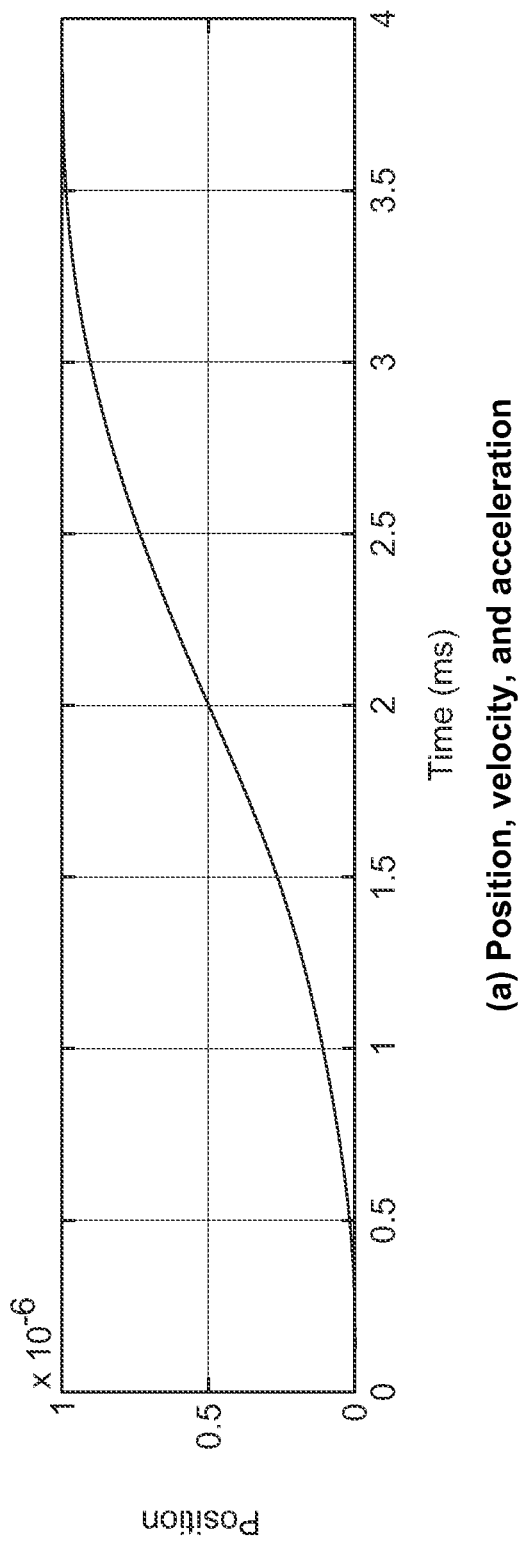
FIGS. 9A-9C show the position, velocity, and acceleration, respectively, of a trajectory with a fifth order polydyne curve which is designed to suppress a mode whose frequency is 2 kHz and damping ratio is 0.005, in accordance with aspects of this disclosure.
Figure 9B:
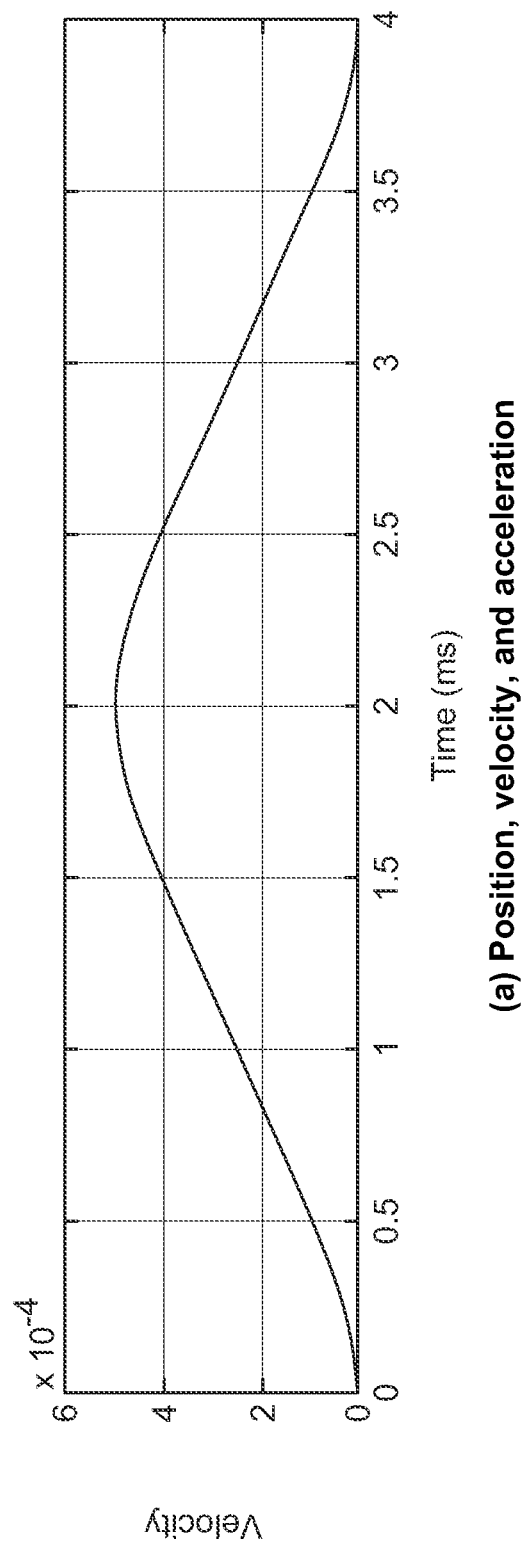
Figure 9C:
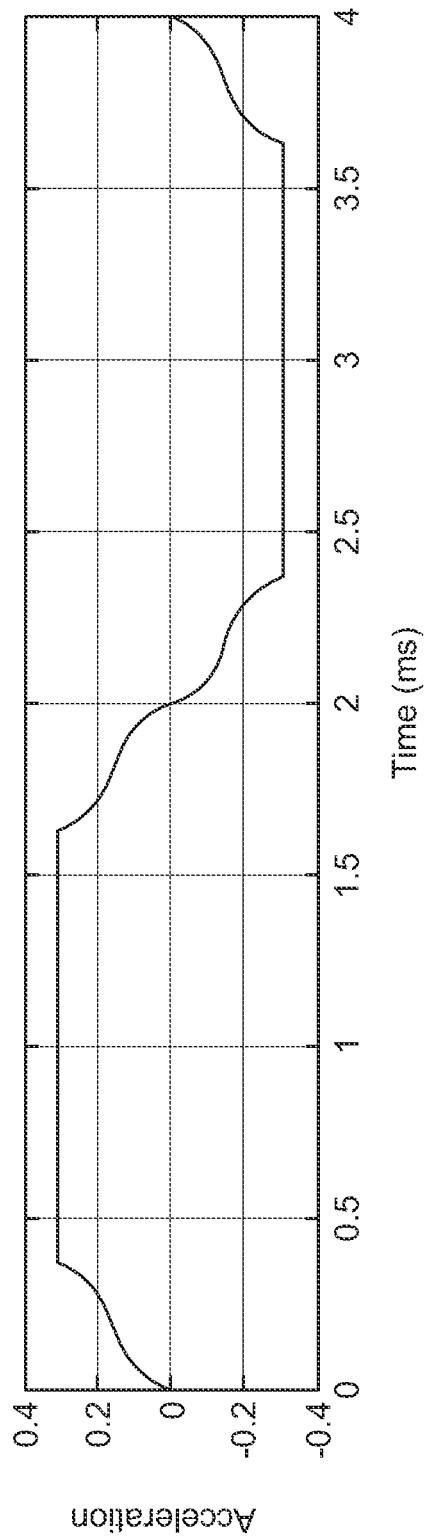
Figure 9D:
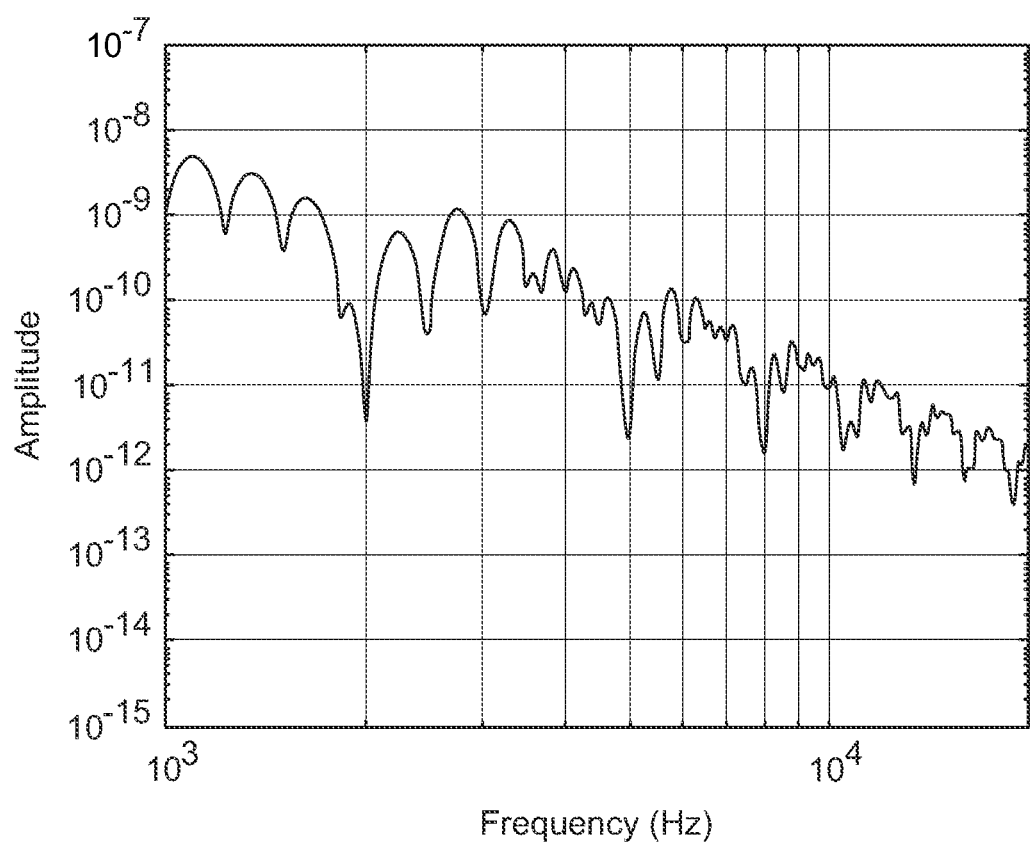
FIG. 9D shows the residual vibration spectrum of the same trajectory as in FIGS. 9A-9C.

FIGS. 9A-9C show the position, velocity, and acceleration, respectively, of a trajectory with a fifth order polydyne curve which is designed to suppress a mode whose frequency is 2 kHz and damping ratio is 0.005, in accordance with aspects of this disclosure. FIG. 9D shows the residual vibration spectrum of the same trajectory. The polydyne curve at the ramp portion warped a lot and its appearance was different in comparison with the acceleration trajectory in FIG. 4C, in which the acceleration changes more smoothly at the beginning and end of the ramp portion. FIG. 9D shows the residual vibration spectrum, obtained by the same way as in section 3.2. A notch appeared at 2 kHz in the spectrum as expected, and notches due to ramp time appeared at 5 kHz, 8 kHz, 10.5 kHz, 13.5 kHz, and so on, but the amplitudes at high frequencies became much larger than that of FIG. 7C, even though the order of polynomial was the same. This increase of residual vibration at high frequencies can be understood by the change of appearance of the ramp portion. This means that the polydyne curve must be designed for resonant modes whose natural frequency is relatively high among the resonant modes of a system to be controlled, in various examples.

4. Conclusions

Acceleration trajectories using polydyne curves to ramp up and ramp down acceleration in accordance with aspects of this disclosure may be used to suppress residual vibrations related to multiple resonant modes, and may be used in accordance with aspects of this disclosure to reduce residual vibrations in high-speed positioning control. A fifth-order polydyne ramp may suppress one resonant mode, and a ninth-order polydyne ramp may suppress two resonant modes. In addition, another mode can be suppressed by canceling out vibrations generated at the beginning and end of a ramp portion, by designing the ramp-up trajectory with a substantially matching, opposite-phase counterpart of the predicted ramp-down vibration, which may be done in combination with a polydyne acceleration trajectory. A simulation study using a mechanical vibration model that has three resonant modes demonstrated that the proposed acceleration trajectories suppressed the residual vibrations completely. Further simulations by using a 1-DOF vibration system showed the relationship of the residual vibration amplitude with the natural frequency and damping ratio of the system.

The results of the simulations include the following observations and analyses, among other advantages. The residual vibration spectra of acceleration trajectories with polydyne ramps had notches at the frequencies designed to be suppressed, thereby confirming suppression of those frequencies. The residual vibration spectrum was attenuated as frequency increases, and its slope can be projected by the order of polynomial. Considering the uncertainties of natural frequency in a physical system, assuming a damping ratio of zero in generating polydyne curve may be a reasonable option within terms of robust design of acceleration trajectories with polydyne ramps, in accordance with various examples of this disclosure.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example they are fabricated into a single integrated circuit or system on a chip (SoC). In addition, the control circuitry may include a preamp circuit implemented as a separate integrated circuit, integrated into the read channel or data storage controller circuit, or integrated into an SoC.

In some examples, the control circuitry comprises a microprocessor executing instructions, the instructions being operable to cause the microprocessor to perform the flow diagrams described herein. The instructions may be stored in any computer-readable medium. In some examples, they may be stored on a non-volatile semiconductor memory device, component, or system external to the microprocessor, or integrated with the microprocessor in an SoC. In some examples, the instructions are stored on the disk and read into a volatile semiconductor memory when the disk drive is powered on. In some examples, the control circuitry comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 may be performed by or embodied in hardware, and/or performed or executed by a controller, a CPU, an FPGA, a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for using acceleration trajectories with polydyne ramps in a positioning control system, and other aspects of this disclosure. Persons skilled in the relevant fields of art will be well-equipped by this disclosure with an understanding and an informed reduction to practice of a wide panoply of further applications, architectures, techniques, and methods for using acceleration trajectories with polydyne ramps in a positioning control system, and other aspects of this disclosure encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A system comprising:
an actuator;
a control object, controlled by the actuator; and
one or more processing devices, configured to perform positioning control of the control object via the actuator, wherein performing the positioning control comprises:
generating a trajectory control signal for a trajectory that comprises a polydyne acceleration ramp configured to suppress at least one resonant mode; and
outputting the trajectory control signal to the actuator.

2. The system of claim 1, wherein the system comprises a data storage system comprising one or more disks, and the control object comprises a read/write head suspended by the actuator proximate to a disk surface of the one or more disks.

3. The system of claim 1, wherein generating the trajectory control signal comprises generating a fifth-order polydyne curve.

4. The system of claim 3, wherein generating the trajectory control signal further comprises designing the fifth-order polydyne curve to suppress at least one resonant mode.

5. The system of claim 3, wherein generating the trajectory control signal further comprises designing the fifth-order polydyne curve in accordance with the equation $$a(t)=a_0(t)+2\zeta\omega_n^{-1}\dot{a}_0(t)+\omega_n^{-2}\ddot{a}_0(t),$$

where a(t) is acceleration at time t, $\omega_n$ is natural frequency, and $\zeta$ is damping ratio.

6. The system of claim 1, wherein generating the trajectory control signal comprises generating a ninth-order polydyne curve.

7. The system of claim 6, wherein generating the trajectory control signal further comprises designing the ninth-order polydyne curve to suppress at least two resonant modes.

8. The system of claim 6, wherein generating the trajectory control signal further comprises designing the ninth-order polydyne curve in accordance with the equation $$a(t)=a_0(t)+2(\zeta_1\omega_1^{-1}+\zeta_2\omega_2^{-1})\dot{a}_0(t)+(\omega_1^{-2}+\omega_2^{-2}+4\zeta_1\zeta_2\omega_1^{-1}\omega_z^{-1})\ddot{a}_0(t)+2(\zeta_1\omega_1^{-1}\omega_2^{-2}+\zeta_2\omega_1^{-2}\omega_2^{-2})\dddot{a}_0(t)+\omega_1^{-2}\omega_2^{-2}\ddddot{a}_0(t),$$

where a(t) is acceleration at time t, $\omega_n$ is natural frequency, and $\zeta$ is damping ratio.

9. The system of claim 1, wherein the trajectory control signal defines a trajectory that comprises a first polydyne acceleration ramp for a ramp-up portion of the trajectory and a second polydyne acceleration ramp for a ramp-down portion of the trajectory.

10. The system of claim 1, wherein performing the positioning control further comprises generating a cancelation vibration in a first portion of the polydyne acceleration ramp that substantially matches and has an opposite phase of a residual vibration of the control object in a final portion of the polydyne acceleration ramp.

11. The system of claim 1, wherein generating the trajectory control signal comprises specifying a natural frequency of a resonant mode to be suppressed.

12. The system of claim 1, wherein generating the trajectory control signal comprises specifying a damping ratio of a resonant mode to be suppressed.

13. The system of claim 12, wherein specifying the damping ratio of the resonant mode to be suppressed comprises specifying a damping ratio in a range of 0.0001 to 0.3.

14. The system of claim 12, wherein specifying the damping ratio of the resonant mode to be suppressed comprises specifying a damping ratio of zero.

15. A method comprising:
generating, by one or more processing devices, a trajectory control signal for a trajectory that comprises a polydyne acceleration ramp configured to suppress at least one resonant mode; and
outputting, by the one or more processing devices, the trajectory control signal to an actuator that controls a control object.

16. The method of claim 15, wherein generating the trajectory control signal further comprises generating a fifth-order polydyne curve, in accordance with the equation $$a(t)=a_0(t)+2\zeta\omega_n^{-1}\dot{a}_0(t)+\omega_n^{-2}\ddot{a}_0(t),$$

where a(t) is acceleration at time t, $\omega_n$ is natural frequency, and $\zeta$ is damping ratio.

17. The method of claim 15, wherein generating the trajectory control signal further comprises generating a ninth-order polydyne curve, in accordance with the equation $$a(t) = a_0(t) + 2(\zeta_1\omega_1^{-1} + \zeta_2\omega_2^{-1})\dot{a}_0(t) + (\omega_1^{-2} + \omega_2^{-2} + 4\zeta_1\zeta_2\omega_1^{-1}\omega_z^{-1})\ddot{a}_0(t) + 2(\zeta_1\omega_1^{-1}\omega_2^{-2} + \zeta_2\omega_1^{-2}\omega_2^{-2})\dddot{a}_0(t) + \omega_1^{-2}\omega_2^{-2}\ddddot{a}_0(t),$$

where a(t) is acceleration at time t, $\omega_n$ is natural frequency, and is $\zeta$ damping ratio.

18. One or more processing devices comprising:

means for generating a trajectory control signal for a trajectory that comprises a polydyne acceleration ramp configured to suppress at least one resonant mode; and means for outputting the trajectory control signal to an actuator that controls a control object.

19. The one or more processing devices of claim 18, wherein the means for generating the trajectory control signal comprises means for generating a fifth-order polydyne curve, in accordance with the equation $$a(t) = a_0(t) + 2\zeta\omega_n^{-1}\dot{a}_0(t) + \omega_n^{-2}\ddot{a}_0(t),$$

where a(t) is acceleration at time t, $\omega_n$ is natural frequency, and $\zeta$ is damping ratio.

20. The one or more processing devices of claim 18, wherein the means for generating the trajectory control signal comprises means for generating a ninth-order polydyne curve, in accordance with the equation $$a(t) = a_0(t) + 2(\zeta_1\omega_1^{-1} + \zeta_2\omega_2^{-1})\dot{a}_0(t) + (\omega_1^{-2} + \omega_2^{-2} + 4\zeta_1\zeta_2\omega_1^{-1}\omega_z^{-1})\ddot{a}_0(t) + 2(\zeta_1\omega_1^{-1}\omega_2^{-2} + \zeta_2\omega_1^{-2}\omega_2^{-2})\dddot{a}_0(t) + \omega_1^{-2}\omega_2^{-2}\ddddot{a}_0(t),$$

where a(t) is acceleration at time t, $\omega_n$ is natural frequency, and is $\zeta$ damping ratio.

\* \* \* \* \*